(12) United States Patent
Sugiura

(10) Patent No.: US 6,906,348 B2
(45) Date of Patent: Jun. 14, 2005

(54) ILLUMINATION DEVICE AND LIQUID CRYSTAL DISPLAY DEVICE

(75) Inventor: Takuro Sugiura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/619,959

(22) Filed: Jul. 14, 2003

(65) Prior Publication Data

US 2004/0012732 A1 Jan. 22, 2004

(30) Foreign Application Priority Data

Jul. 15, 2002 (JP) .................................... 2002-205701

(51) Int. Cl.⁷ .................... H01L 29/04; H01L 31/036
(52) U.S. Cl. ........................ 257/72; 257/88; 438/30; 438/31; 438/32; 438/42
(58) Field of Search ................. 257/72, 88; 438/30, 438/31, 32, 42

(56) References Cited

U.S. PATENT DOCUMENTS

| | | | |
|---|---|---|---|
| 6,104,453 A | | 8/2000 | Watanabe |
| 6,323,919 B1 | | 11/2001 | Yang et al. |
| 6,816,214 B1 | | 11/2004 | Ohsumi |
| 2002/0021385 A1 | * | 2/2002 | Nakabayashi et al. ........ 349/65 |
| 2003/0059575 A1 | * | 3/2003 | Obuchi et al. .............. 428/156 |

FOREIGN PATENT DOCUMENTS

| | | |
|---|---|---|
| EP | 0 940 706 | 9/1999 |
| EP | 1 079 264 A2 | 2/2001 |
| EP | 1 079 264 A3 | 4/2004 |
| JP | 2000-180631 | 6/2000 |
| WO | WO 99/63394 | 12/1999 |

OTHER PUBLICATIONS

Copy of Search Report dated Jan. 3, 2005 for European Patent Application No. EP 03 25 4420.

* cited by examiner

Primary Examiner—Long Pham
(74) Attorney, Agent, or Firm—Brinks Hofer Gilson & Lione

(57) ABSTRACT

An illumination device includes a light source composed of a light emitting element and an intermediate light guide, and a light guide plate that receives light from the light source through a light incident face and that emits the light propagating therein from an emergent surface. A reflecting surface of the light guide plate has a plurality of prism grooves formed in stripes in plan view, each prism groove having a gently inclined face and a sharply inclined face inclined more sharply than the gently inclined face. A $\theta_2$-coefficient, which is the product of the number of the sharply inclined faces per unit length of the light guide plate, and the length of the sharply inclined faces, is increased away from the light source in the light guide plate.

22 Claims, 15 Drawing Sheets

ILLUMINATION DEVICE AND LIQUID CRYSTAL DISPLAY DEVICE

BACKGROUND OF THE INVENTION

1. Field of the Invention

The present invention relates to an illumination device and a liquid crystal display device, and more particularly, to the configurations of an illumination device that can uniformly and brightly illuminate a large area with only one light source, and of a liquid crystal display device using the illumination device.

2. Description of the Related Art

Front lights of reflective liquid crystal display devices have been formed in a unit including a light source, an intermediate light guide, a light guide plate, and a case member having a reflective inner surface to hold these members together.

FIG. 15A is a perspective structural view of a conventional liquid crystal display device, FIG. 15B is a plan view of a front light provided in the liquid crystal display device shown in FIG. 15A, as viewed from the viewing side, and FIG. 16 is a cross-sectional structural view of the liquid crystal display device shown in FIG. 15. The liquid crystal display device shown in these figures includes a liquid crystal display unit 120, and a front light 110 disposed on the front side of the liquid crystal display unit 120. Although not shown in detail, the liquid crystal display unit 120 is a reflective liquid crystal display unit that performs display by reflecting light incident from its front side, and holds a liquid crystal layer 123 between an upper substrate 121 and a lower substrate 122 opposing each other. By controlling the alignment state in the liquid crystal layer 123, the light transmitting state is changed to perform display.

The front light 110 includes a flat light guide plate 112, a bar-shaped intermediate light guide 113 disposed at an end face 112a of the light guide plate 112, and a light emitting element 115 disposed at one end face of the intermediate light guide 113. An upper surface of the light guide plate 112 serves as a reflecting surface 112c on which a plurality of prism grooves 114 of wedge-shaped cross section are formed in parallel and in stripes in plan view, and a lower surface thereof serves as an emergent surface 112b from which illumination light for illuminating the liquid crystal display unit 120 is emitted. Each of the prism grooves 114 is composed of a gently inclined face 114a and a sharply inclined face 114b, as shown in FIG. 16. The inclination angle $\theta_1$ of the gently inclined faces 114a is set at a fixed value within the range of 5° to 35°, and the inclination angle $\theta_2$ of the sharply inclined faces 114b is set at a fixed value larger than the inclination angle $\theta_1$ of the gently inclined face 114a. The pitch P of the prism grooves 114 (width of the prism grooves 114) is fixed in the plane of the reflecting surface 112c. The depth "d" of the prism grooves 114 is also fixed in the plane of the reflecting surface 112c. These prism grooves 114 are slightly inclined relative to the end face 112a of the light guide plate 112 in order to prevent moirée fringes.

In the front light 110, light emitted from the light emitting element 115 is applied through the intermediate light guide 113 to the end face 112a of the light guide plate 112, and is introduced into the light guide plate 112. The light is reflected by the inner side of the upper surface 112c of the light guide plate 112 having a prism shape to change the propagating direction thereof, and is emitted from the lower surface 112b of the light guide plate 112 toward the liquid crystal display unit 120.

In portable electronic devices such as personal digital assistants and portable game machines, since the battery driving time has a great influence on the ease of use, liquid crystal display devices used as display sections in the electronic devices have adopted a single-LED front light having only a single light emitting element, as in the front light 110 shown in FIG. 15, in order to reduce the power consumption of the front light. That is, the number of light emitting elements is limited to reduce the power consumption. Furthermore, with size reduction of the portable electronic devices, there has been a request to reduce the thickness of the front light to approximately 1 mm.

It is, however, substantially impossible for such a single-LED front light to uniformly and brightly illuminate a large display region having a diagonal size of several inches or more by a combination of the thin light guide plate and the single light emitting element. That is, in a case in which the light emitting element 115 is provided on one side of the front light 110 shown in FIG. 15, it is first necessary to make incident light uniform in the lengthwise direction of the end face 112a of the light guide plate 112 by the intermediate light guide 113 in order to uniformly guide light from the light emitting element 115 to the light guide plate 112. It is, however, difficult for the intermediate light guide 113 to make light incident on the light guide plate 112 uniform. Moreover, since the amount of light emitted from the light guide plate 112 having the above-described structure is decreased away from the light emitting element 115, it is difficult to obtain uniform light from the entire emergent surface 112b, and to uniformly illuminate the display region of the liquid crystal display unit 120 without causing variations in luminance. This sometimes reduces display visibility.

While there is an increasing demand for a front light using a single light emitting element as a light source in this way, a thin front light that can uniformly and brightly illuminate a large area has not yet been achieved.

SUMMARY OF THE INVENTION

The present invention has been made to solve the above problems, and an object of the invention is to provide an illumination device that can uniformly and brightly illuminate a large area and that can reduce power consumption.

Another object of the present invention is to provide a liquid crystal display device that has the above illumination device and that achieves high luminance and high display quality.

In order to achieve the above objects, according to an aspect, the present invention provides an illumination device including a light source, and a light guide plate that receives light from the light source through an end face and that emits the light propagating therein from one surface, wherein the end face of the light guide plate through which the light is received serves as a light incident face, and the other surface of the light guide plate is provided with a plurality of prism grooves arranged in stripes in plan view and having gently inclined faces and sharply inclined faces inclined at an inclination angle larger than the inclination angle of the gently inclined faces, and wherein the pitch of the prism grooves decreases away from the light source.

According to another aspect, the present invention provides an illumination device including a light source, and a light guide plate that receives light from the light source through an end face and that emits the light propagating therein from one surface, wherein the end face of the light guide plate through which the light is received serves as a light incident face, and the other surface of the light guide plate is provided with a plurality of prism grooves arranged in stripes in plan view and having gently inclined faces and sharply inclined faces inclined at an inclination angle larger than the inclination angle of the gently inclined faces, and wherein the inclination angle of the sharply inclined faces increases away from the light source.

According to a further aspect, the present invention provides an illumination device including a light source, and a light guide plate that receives light from the light source through an end face and that emits the light propagating therein from one surface, wherein the end face of the light guide plate through which the light is received serves as a light incident face, and the other surface of the light guide plate is provided with a plurality of prism grooves arranged in stripes in plan view and having gently inclined faces and sharply inclined faces inclined at a inclination angle larger than the inclination angle of the gently inclined faces, and wherein the length of the sharply inclined faces increases away from the light source.

According to a still further aspect, the present invention provides an illumination device including a light source, and a light guide plate that receives light from the light source through an end face and that emits the light propagating therein from one surface, wherein the end face of the light guide plate through which the light is received serves as a light incident face, and the other surface of the light guide plate is provided with a plurality of prism grooves arranged in stripes in plan view and having gently inclined faces and sharply inclined faces inclined at an inclination angle $\theta_2$ larger that the inclination angle $\theta_1$ of the gently inclined faces, and wherein a $\theta_2$-coefficient of the light guide plate increases away from the light source, and the $\theta_2$-coefficient is the ratio of the length of the sharply inclined faces to the pitch of the prism grooves, or the product of the number of the sharply inclined faces per unit length of the light guide plate, and the length of the sharply inclined faces.

Since this illumination device has the light guide plate in which the $\theta_2$-coefficient increases away from the light source, the amount of light emitted from one surface (emergent surface) of the light guide plate is uniform in the plane of the light guide plate, the utilization efficiency of the light source is high, and the luminance is high. More specifically, at the position near the light source where the amount of light propagating inside the light guide plate is relatively large, the amount of light directed toward the emergent surface by the sharply inclined faces is reduced by decreasing the $\theta_2$-coefficient (in other words, by reducing the proportion of the sharply inclined faces that contribute to the emission of light from the light emergent surface near the light source). In contrast, at the positions apart from the light source where the amount of light propagating inside the light guide plate is relatively small, the amount of light directed toward the emergent surface by the sharply inclined faces is increased by increasing the $\theta_2$-coefficient (in other words, by increasing the proportion of the sharply inclined faces that contribute to the emission of light from the light emergent surface apart from the light source). Consequently, the distribution of the amount of emitted light is uniform in the entire light guide plate. Since the amount of light emitted directed toward the emergent surface by the sharply inclined faces increases away from the light source, the amount of emitted light can be made uniform in the plane of the light guide plate.

Accordingly, the illumination device of the present invention can uniformly and brightly illuminate a large area with low power consumption.

The $\theta_2$-coefficient of the light guide plate may be increased away from the light source by changing the inclination angle $\theta_1$ of the gently inclined faces and the inclination angle $\theta_2$ of the sharply inclined faces.

The $\theta_2$-coefficient of the light guide plate may be increased away from the light source by changing at least one of the pitch of the prism grooves and the length of the sharply inclined faces while the sum of the inclination angle $\theta_1$ of the gently inclined faces and the inclination angle $\theta_2$ of the sharply inclined faces is not fixed. Alternatively, the $\theta_2$-coefficient may be increased away from the light source by changing the pitch of the prism grooves or the length of the sharply inclined faces while the sum of the inclination angle $\theta_1$ of the gently inclined faces and the inclination angle $\theta_2$ of the sharply inclined faces is substantially fixed.

The $\theta_2$-coefficient of the light guide plate may be increased away from the light source by changing the length of the sharply inclined faces and the height of prism tops while the inclination angle $\theta_1$ of the gently inclined faces, the inclination angle $\theta_2$ of the sharply inclined faces, and the pitch of the prism grooves are fixed.

In particular, in the light guide plate in which the $\theta_2$-coefficient is increased away from the light source by changing the pitch of the prism grooves while the sum of $\theta_1$ and $\theta_2$ is fixed, when grooves having a shape similar to that of the prism grooves are formed on one surface of a mold base material by cutting with a cutting tool, a first inclined face having an inclination angle similar to that of a gently inclined face and a second inclined face having an inclination angle similar to that of a sharply inclined face can be simultaneously obtained by forming one groove with a cutting tool in which the angle of a cutting edge is equal to $180°-(\theta_1+\theta_2)$. This is advantageous because the number of operation processes for forming one groove is reduced. Furthermore, since subsequent grooves can be sequentially formed while changing the groove pitch and the angle of the center axis of the cutting tool, a mold having a plurality of grooves formed in stripes can be produced. Then, an injection mold having irregularities reverse to those on the surface of the produced mold is formed by the produced mold, and a light guide plate is produced by performing injection molding with the injection mold.

In the light guide plate in which the sum of $\theta_1$ and $\theta_2$ is not fixed and the $\theta_2$-coefficient is increased away from the light source by changing at least one of the pitch of the prism grooves and the length of the sharply inclined faces, when grooves having a shape similar to that of the prism grooves are formed on one surface of a mold base material by cutting with a cutting tool, after a first inclined face having an inclination angle similar to that of a gently inclined face is formed by one surface of the cutting edge of the cutting tool, a second inclined face having an inclination angle similar to that of a sharply inclined face is formed by the other surface of the cutting edge while the angle of the center axis of the cutting tool is changed. Therefore, the number of operation processes for forming one groove is increased.

Preferably, the $\theta_2$-coefficient is within the range of 0.045 to 0.085 when it is the product of the number of the sharply inclined faces per unit length of the light guide plate, and the length of the sharply inclined faces. A $\theta_2$-coefficient less than 0.045 is not preferable because a light component applied onto a surface to be illuminated, such as a panel surface (surface of a liquid crystal display unit), is insufficient and the luminance of emitted light is reduced. A $\theta_2$-coefficient more than 0.085 is also not preferable because the luminance uniformity is pronouncedly reduced in the plane of the light guide plate, although the amount of emitted light is increased.

It is preferable, for a reason similar to the above, that the $\theta_2$-coefficient be within the range of 0.045 to 0.085 when it is the ratio of the length of the sharply inclined faces to the pitch of the prism grooves (that is, L/P).

Preferably, the inclination angle $\theta_1$ of the gently inclined faces of the prism grooves in the light guide plate is within the range of 1° to 5°, and the inclination angle $\theta_2$ of the sharply inclined faces is within the range of 40° to 45°.

An inclination angle $\theta_1$ less than 1° is not preferable because a sufficient luminance cannot be obtained as the illumination device. An inclination angle $\theta_1$ more than 5° is also not preferable because the uniformity of light emitted from the emergent surface of the light guide plate is reduced. Inclination angles $\theta_2$ less than 40° and more than 45° are not preferable because the luminance of the illumination device is reduced.

Preferably, the angle formed between the prism grooves and the light incident face of the light guide is within the range of 6.5° to 8.5°. Outside the above range, moiré fringes are prone to be caused.

According to a still further aspect, the present invention provides a liquid crystal display device including any of the above illumination devices, and a liquid crystal display unit to be illuminated by the illumination device.

Since the liquid crystal display device of the present invention has the illumination device that can uniformly illuminate a large area with high intensity, the entire display region is illuminated with high and uniform intensity, and a superior display quality is achieved. Even when the illumination device uses a single light emitting element, the uniformity of brightness is not reduced, and display visibility is high. Accordingly, it is possible to achieve a liquid crystal display device that provides high display quality and that reduces power consumption.

Further objects, features and advantages of the present invention will become apparent from the following description of the preferred embodiments with reference to the attached drawings.

DESCRIPTION OF THE PREFERRED EMBODIMENTS

Preferred embodiments of the present invention will be described below with reference to the attached drawings.
(First Embodiment)
[Overall Configuration of Liquid Crystal Display Device]

Figure 1:
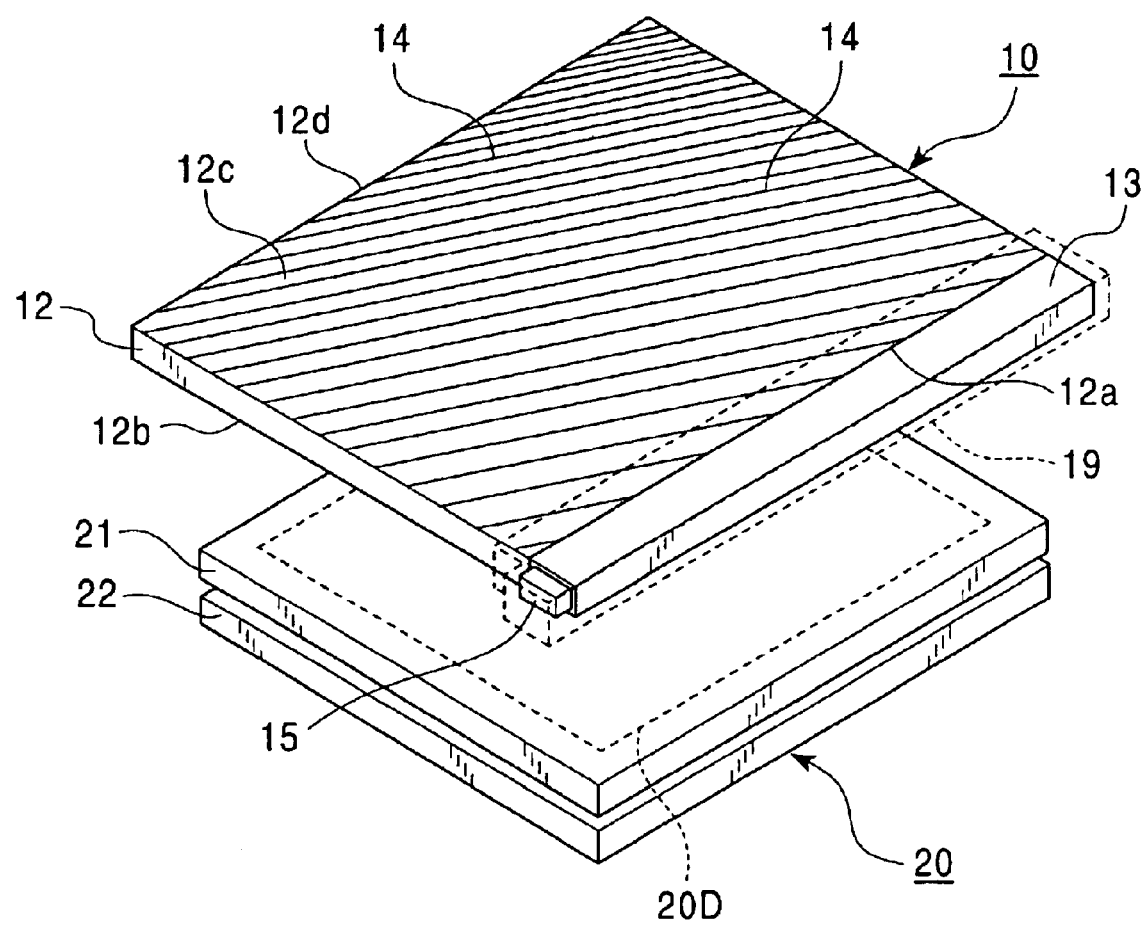
FIG. 1 is a perspective structural view of a liquid crystal display device according to a first embodiment of the present invention.
Figure 2:
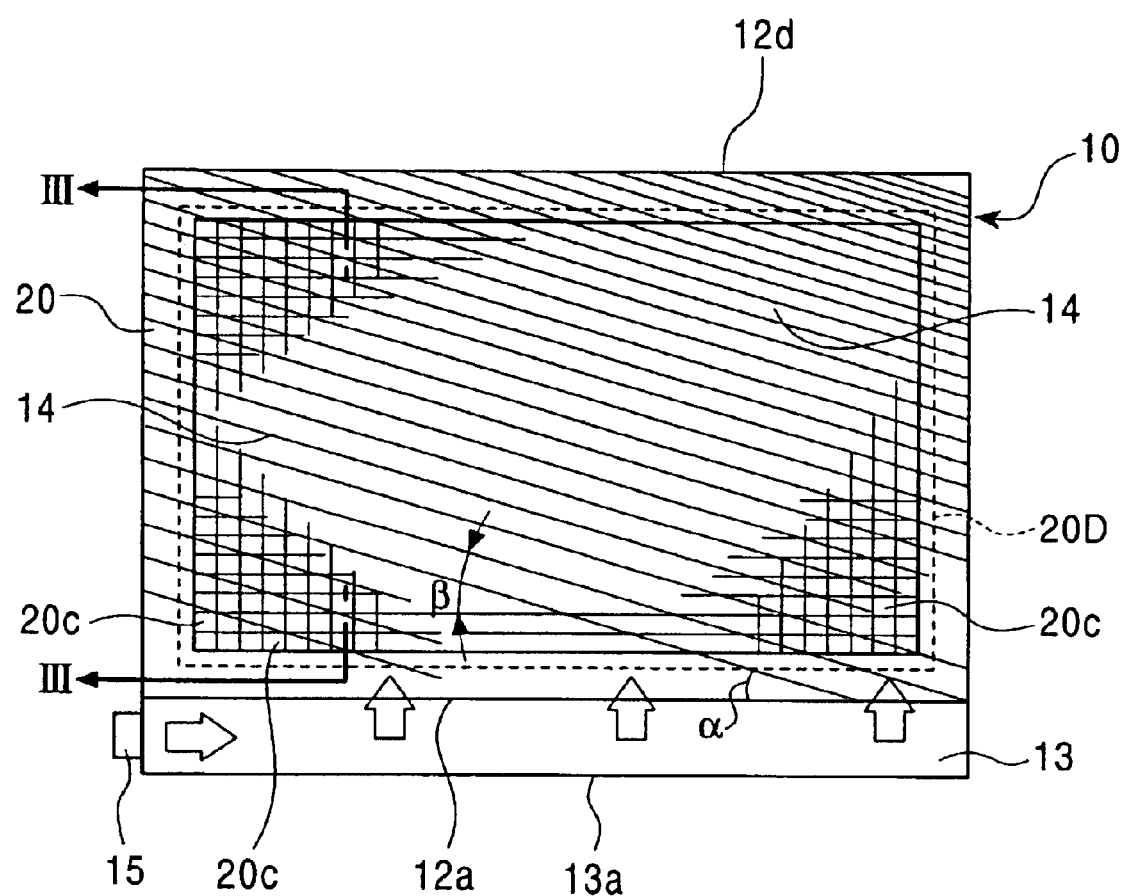
FIG. 2 is a structural plan view of the liquid crystal display device shown in FIG. 1.
Figure 3:
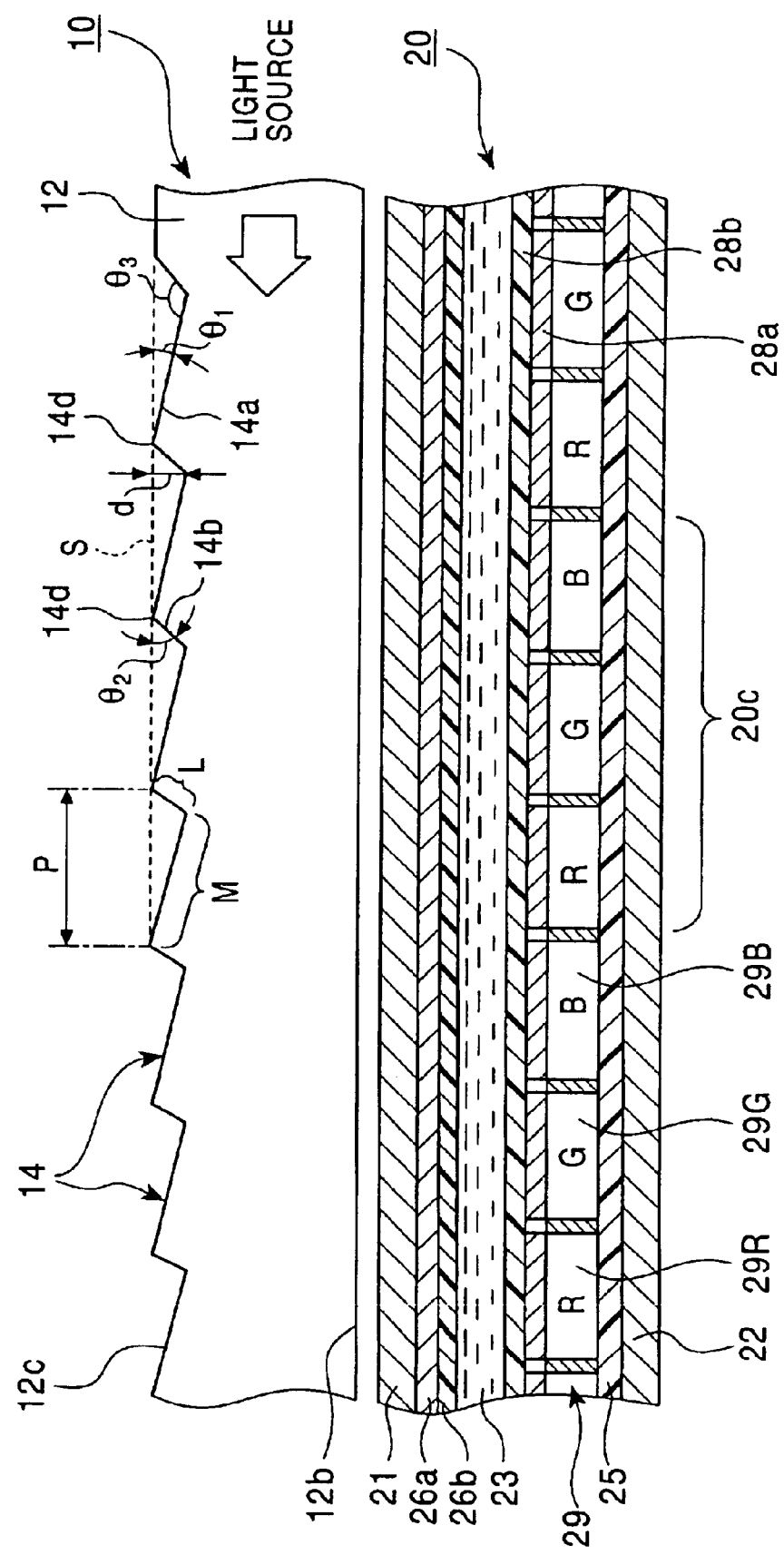
FIG. 3 is a cross-sectional view of the liquid crystal display device, taken along line III—III in FIG. 2.

FIG. 1 is a perspective structural view of a liquid crystal display device according to a first embodiment of the present invention, FIG. 2 is a structural plan view of the liquid crystal display device shown in FIG. 1, and FIG. 3 is a cross-sectional view of the liquid crystal display device, taken along line III—III in FIG. 2. Referring to FIGS. 1 to 3, the liquid crystal display device of the first embodiment includes a front light (illumination device) 10, and a reflective liquid crystal display unit 20 disposed on the back side (lower side in the figures) of the front light 10.

As shown in FIG. 1, the front light 10 includes a substantially flat transparent light guide plate 12, an intermediate light guide 13 disposed along an end face 12a of the light guide plate 12, a light emitting element 15 disposed at one end face of the intermediate light guide 13, and a case member (shielding member) 19 attached from the side of the intermediate light guide 13 to cover the intermediate light guide 13, the light emitting element 15, and an end portion of the light guide plate 12.

That is, in the front light 10 of the first embodiment, the light emitting element 15 and the intermediate light guide 13 constitute a light source, and the end face (one end face) 12a of the light guide plate 12 serves as a light incident face. As shown in FIG. 2, a plurality of prism grooves 14 are arranged on an outer surface (upper surface in the figures) of the light guide plate 12 so that they are inclined at an angle α to the light incident face 12a at which the intermediate light guide 13 is disposed. In FIGS. 1 and 2, reference numeral 12d denotes an end face (terminal end face) of the light guide plate 12 remote from the light incident face 12a.

The liquid crystal display unit 20 includes an upper substrate 21 and a lower substrate 22 opposing each other. A rectangular region 20D shown by a dotted line in FIG. 1 serves as a display region of the liquid crystal display unit 20, and pixels 20c are formed in a matrix inside the display region 20D, as shown in FIG. 2.

In the liquid crystal display device having the above configuration, the light guide plate 12 is disposed on the display region 20D of the liquid crystal display unit 20, and a display on the liquid crystal display unit 20 can be viewed through the light guide plate 12. In a dark place where external light cannot be obtained, the light emitting element 15 is lighted, and light therefrom is introduced into the light guide plate 12 through the intermediate light guide 13 and the light incident face 12a, and is emitted from a lower surface (one surface) 12b of the light guide plate 12 toward the liquid crystal display unit 20, thereby illuminating the liquid crystal display unit 20.

Next, the structures of the components of the liquid crystal display device of the first embodiment will be described in detail with reference to the drawings.

[Front Light]

The light guide plate 12 of the front light 10 is a member shaped like a flat plate and disposed on the display region 20D of the liquid crystal display unit 20 to emit light, which is emitted from the light emitting element 15, from the lower surface 12b to the liquid crystal display unit 20, and is made of transparent acrylic resin or the like. As shown in FIG. 3 as a partial sectional view, the upper surface (the other surface, in other words, a surface remote from the liquid crystal display unit 20) of the light guide plate 12 serves as a reflecting surface 12c on which the prism grooves 14 of wedge-shaped cross section are formed in parallel and in stripes in plan view. The lower surface (a surface opposing the liquid crystal display unit 20) of the light guide plate 12 serves as an emergent surface 12b from which illumination light for illuminating the liquid crystal display unit 20 is emitted.

Each of the prism grooves 14 is composed of a pair of inclined faces inclined relative to a reference plane S of the reflecting surface 12c. One of these inclined faces serves as a gently inclined face 14a, and the other inclined face serves as a sharply inclined face 14b with an inclination angle more than that of the gently inclined face 14a. As shown in FIGS. 1 and 2, the prism grooves 14 are diagonally formed so that the extending direction thereof crosses the end face 12a of the light guide plate 12.

Light that propagates inside the light guide plate 12 from the right to the left in FIG. 3 is reflected toward the emergent surface 12b by the sharply inclined faces 14b of the reflecting surface 12c, and is emitted toward the liquid crystal display unit 20 disposed on the back side of the light guide plate 12.

In the light guide plate 12 provided in the front light 10 of first embodiment, the luminance uniformity of the front light 10 can be enhanced because a $\theta_2$-coefficient increases away from the light source (in other words, the $\theta_2$-coefficient is higher on the side of the terminal end face than on the side of the light incident face in the light guide plate 12 shown in FIG. 3). The $\theta_2$-coefficient is the product of the number of the sharply inclined faces 14b per unit length in the light guide plate 12 (for example, 1 mm in the light guide plate 12 in the up-down direction in FIG. 2 or in the right-left direction in FIG. 3), and the length L of the sharply inclined faces 14b. For the above-described reason, it is preferable that the $\theta_2$-coefficient be within the range of 0.045 to 0.085.

The $\theta_2$-coefficient is increased away from the light source by changing the inclination angle $\theta_1$ of the gently inclined faces 14a and the inclination angle $\theta_2$ of the sharply inclined faces 14b. More specifically, the inclination angles $\theta_1$ and $\theta_2$ are increased away from the light source. Furthermore, in the first embodiment, the sum of the inclination angles $\theta_1$ and $\theta_2$ is not fixed, and the pitch P of the prism grooves 14 (width of the prism grooves 14) is decreased away from the light source, while the length L of the sharply inclined faces 14b is substantially fixed, as shown in FIG. 3. More specifically, since the right side in FIG. 3 is the side of the light incident face 12a at which the intermediate light guide is disposed, and therefore, is close to the light source. In contrast, the left side is remote from the light incident face 12a, in other words, is the side of the terminal end face 12d, and therefore, is apart from the light source. Accordingly, the pitch P of the prism grooves 14 gradually decreases from the right side to the left side. In other words, one of the adjoining prism grooves 14 closer to the light emitting element 15 in FIG. 1 has a pitch P longer than that of the other.

The length M of the gently inclined faces 14a is decreased away from the light source. The depth "d" of the prism grooves 14 (distance between the reference plane S and the bottoms of the prism grooves 14) is fixed in the plane of the reflecting surface 12c.

Since the inclination angles $\theta_1$ and $\theta_2$ are changed, as described above, the angle $\theta_3$ of the bottoms of the prism grooves 14 is not fixed.

In the front light 10, the inclination angle $\theta_1$ of the gently inclined faces 14a relative to the reference plane S of the reflecting surface 12c shown in FIG. 3 is set to be within the range of 1° to 5°, and the inclination angle $\theta_2$ of the sharply inclined faces 14b is set to be within the range of 40° to 45°. By setting such ranges, light that propagates inside the light guide plate 12 can be efficiently emitted toward the liquid crystal display unit 20, and bright display can be performed. The average luminance of the front light 10 decreases when the inclination angle $\theta_1$ of the gently inclined faces 14a is less than 1°, and the amount of emitted light from the light guide plate 12 cannot be made uniform when the inclination angle $\theta_1$ exceeds 5°. It is not preferable that the inclination angle $\theta_2$ of the sharply inclined faces 14b be less than 40° or more than 45° because the propagating direction of light reflected by the sharply inclined faces 14b greatly deviates from the direction of the normal to the emergent surface 12b, and the amount of light emitted from the emergent surface 12b (that is, the luminance of the front light 10) decreases. The reference plane S of the reflecting surface 12c includes tops 14d between the adjoining prism grooves 14 of the light guide plate 12.

As shown in FIG. 2, it is preferable that the inclination angle α of the prism grooves 14 formed with the end face 12a of the light guide plate 12 be within the range of 0° to 15°. It is more preferable that the inclination angle α be within the range of 6.5° to 8.5°. By setting such ranges, moiré fringes are rarely produced and the emergent light is highly uniform in the front light 10.

The material of the light guide plate 12 may be composed not only of acrylic resin, but also of a resin material that has a high reflectance for all the rays, such as polycarbonate resin, epoxy resin, or polyolefin resin, glass, or the like.

Since the amount of light emitted from the entire light guide plate 12 can be made more uniform as the thickness of the light guide plate 12 increases, it is preferable that the thickness of the light guide plate 12 be more than or equal to 0.8 mm, and more preferable that the thickness be more than or equal to 1.0 mm. Since the luminance obtained when the thickness is more than or equal to 1.2 mm is not substantially different from that when the thickness is within the range of 1.0 mm to 1.5 mm, it is preferable, in terms of thickness reduction of the front light 10, that the upper limit of thickness of the light guide plate 12 be set at 1.5 mm.

Figure 10A:
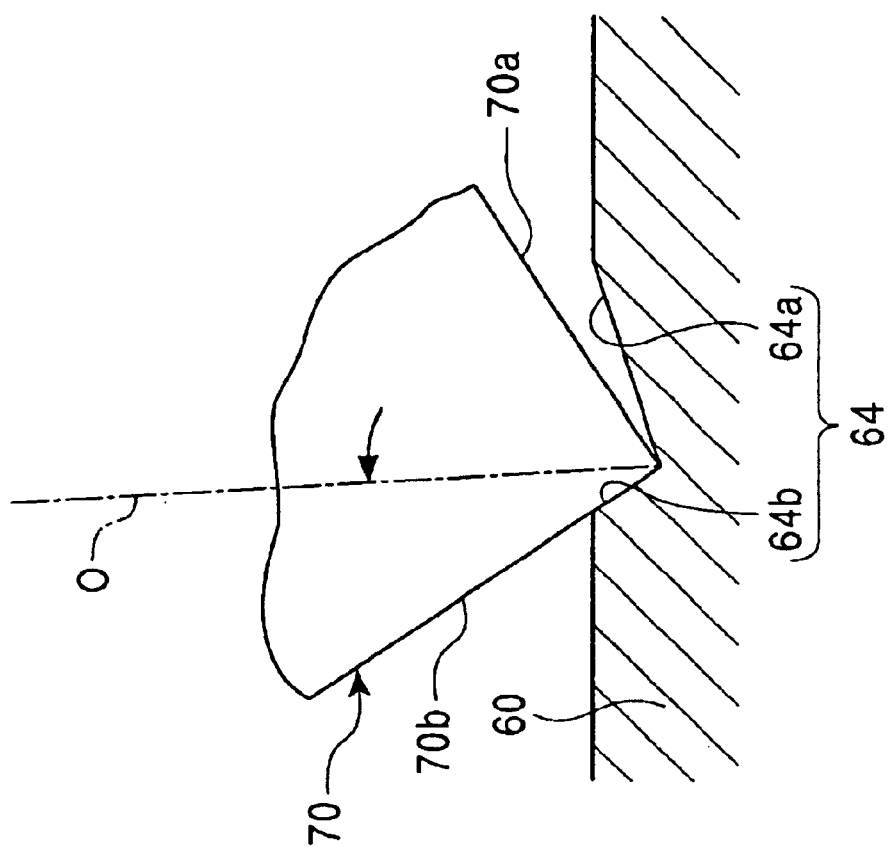
FIGS. 10A and 10B are explanatory views showing a production method for a mold base material for forming a mold used to produce a light guide plate provided in the front light shown in FIG. 3.
Figure 10B:
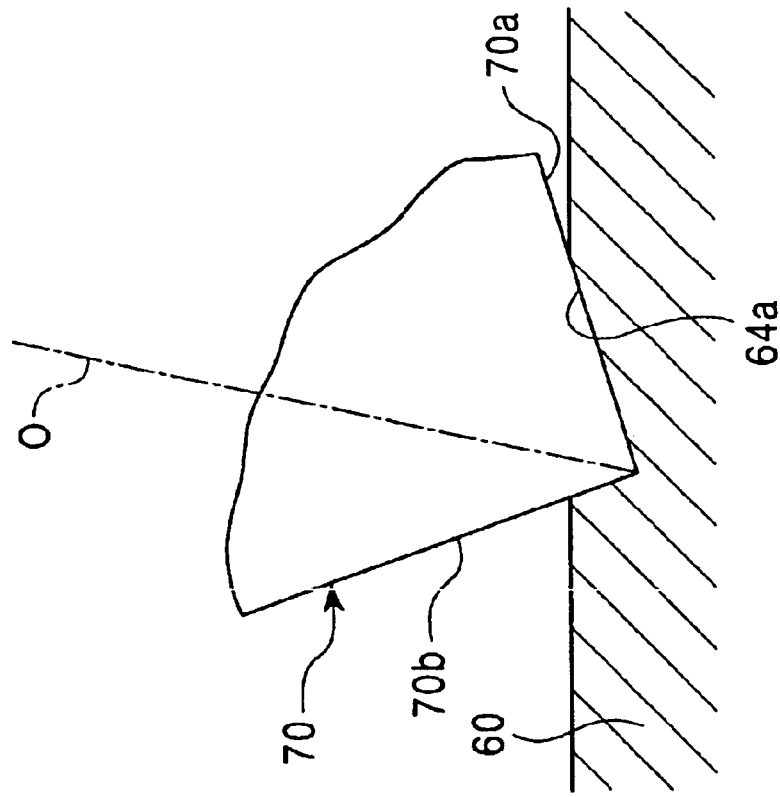

The above-described light guide plate 12 can be produced, for example, by producing, on one surface of a mold base material, a mold having grooves having a shape similar to that of the prism grooves 14 by cutting with a cutting tool, producing, by the mold, an injection mold having irregularities reverse to those on the surface of the produced mold with the grooves, and performing injection molding with the injection mold. Regarding the production method for the mold, after a first inclined face 64a having an inclination angle similar to that of a gently inclined face 14a of a prism groove 14 is formed by cutting a surface of a mold base material 60 made of a Ni-plated stainless steel flat plate with one surface 70a of a cutting edge of a cutting tool 70, as shown in FIG. 10A, a second inclined face 64b having an inclination angle similar to that of a sharply inclined face 14b of the prism groove 14 is formed by cutting the surface of the mold base material 60 with the other surface 70b of the cutting edge while the angle of the center axis O of the cutting tool 70 is changed, as shown in FIG. 10B, thereby forming one groove. By repeating such a process, a mold having a plurality of grooves 64 arranged in stripes can be obtained.

Figure 4:
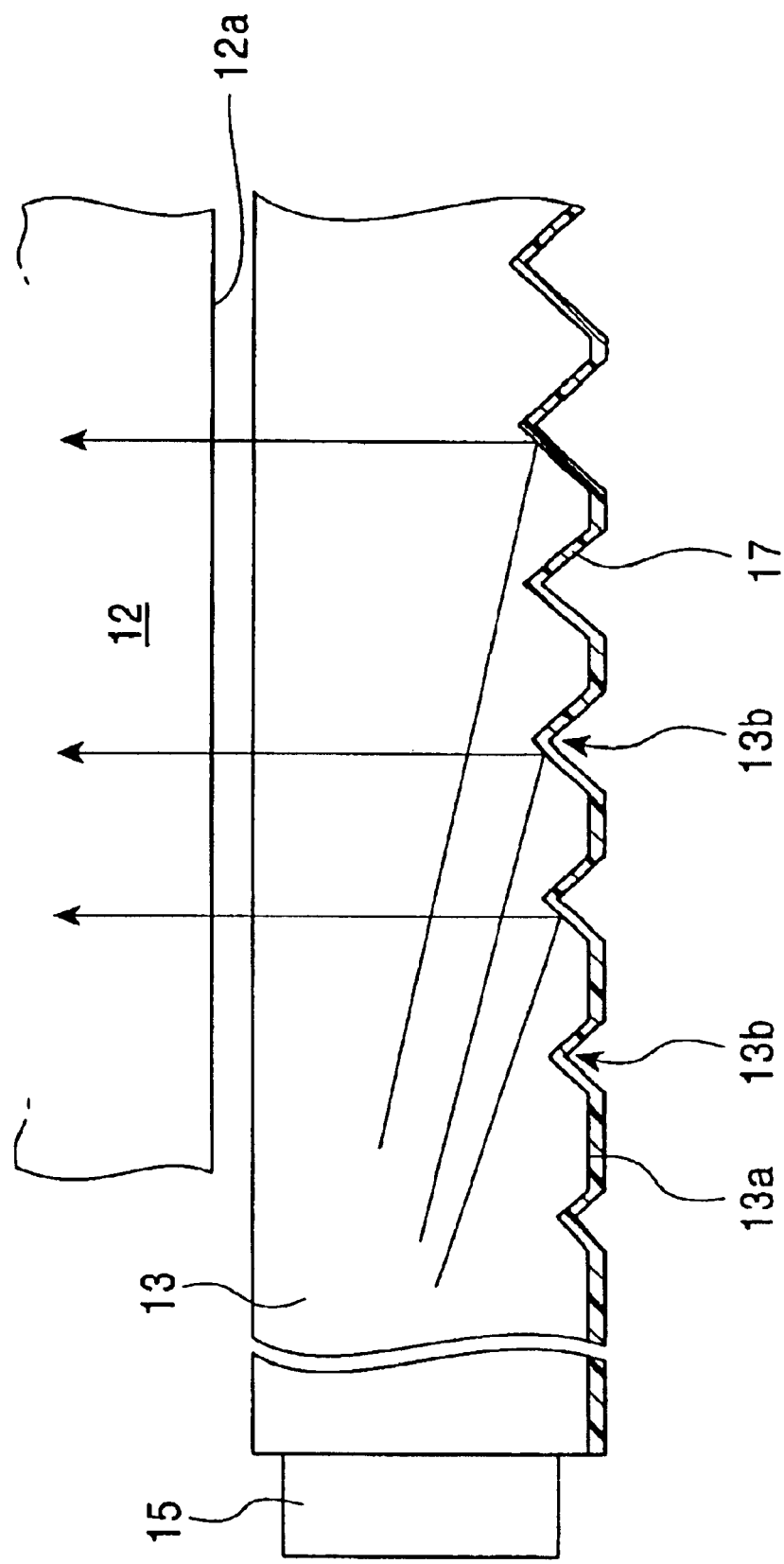
FIG. 4 is an enlarged structural plan view of an intermediate light guide shown in FIG. 2.

The intermediate light guide 13 is a transparent member that is shaped like a quadratic prism along the end face (light incident face) 12a of the light guide plate 12, and the light emitting element 15 is disposed at one end face of the intermediate light guide 13. FIG. 4 is an enlarged structural plan view of the intermediate light guide 13. As shown in FIG. 4, a lower surface of the intermediate light guide 13 (a surface remote from the light guide plate 12) serves as a prism surface 13a on which a plurality of grooves 13b shaped like a wedge in plan view are arranged in parallel. Light emitted from the light emitting element 15 propagates inside the intermediate light guide 13 in the lengthwise direction thereof, is reflected by inner surfaces of the wedge-shaped grooves 13b, and is emitted toward the light guide plate 12. As shown in FIG. 4, the depth of the wedge-shaped grooves 13b increases away from the light emitting element 15 so that light can be uniformly applied onto the end face 12a of the light guide plate 12.

A reflective film 17 made of a high-reflectance metal thin film, for example, an Al film of Al or an Al alloy or an Ag film of Ag or an Ag alloy is formed on the prism surface 13a of the intermediate light guide 13 having the wedge-shaped grooves 13b. The reflective film 17 enhances the reflectance of the prism surface 13a in order to increase the amount of light that enters the light guide plate 12.

The intermediate light guide 13 may be composed not only of acrylic resin, but also of a high-transmittance resin material, such as a polycarbonate resin or epoxy resin, glass, or the like. The light emitting element 15 may be a white LED (Light Emitting Diode), an organic EL element, or the like as long as it can be disposed at the end face of the intermediate light guide 13. Of course, the light emitting element 15 may be provided at both ends of the intermediate light guide 13. In some cases, one or a plurality of light emitting elements may be directly arranged along the light incident face 12a of the light guide plate 12. In these cases, it is effective to use a CCFL (cold-cathode fluorescent lamp).

Figure 5:
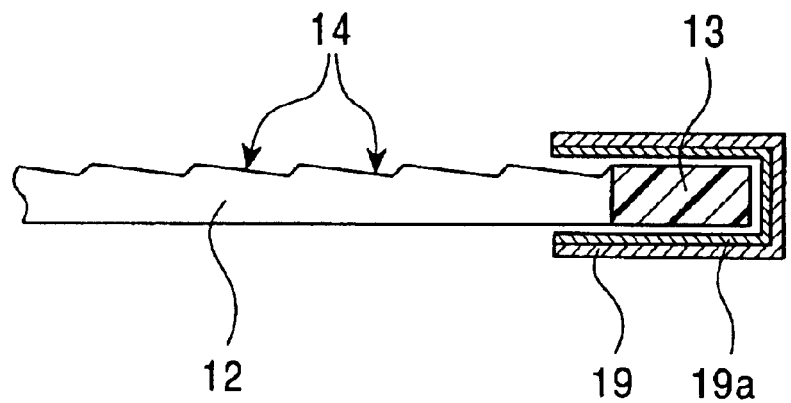
FIG. 5 is a partial sectional view of a front light shown in FIG. 1.

The case member 19 is attached to a side of the front light 10 on which the intermediate light guide 13 is disposed, as shown in FIG. 1. FIG. 5 shows a cross-sectional structure of the front light 10 including the case member 19. As shown in FIG. 5, a reflective film 19a made of a high-reflectance metal thin film of Al, Ag, or the like is formed on an inner surface of the case member 19. Light leaking out from the ends of the intermediate light guide 13 and the light guide plate 12 is reflected by the reflective film 19a, and is thereby caused to enter the intermediate light guide 13 again for use as illumination light.

Since the front light 10 is provided with the light guide plate 12 in which the $\theta_2$-coefficient increases away from the light source, the amount of light emitted from the emergent surface 12b is uniform inside the plane of the light guide plate 12, the utilization efficiency of the light source is high, and high luminance is achieved.

More specifically, the amount of light propagating inside the light guide plate 12 is the largest at the light incident face 12a, and a part of the light is emitted from the emergent surface 12b by the prism grooves 14 while propagating inside the light guide plate 12. Therefore, the amount of light propagating therein decreases away from the light incident face 12a. In the front light 10 of the first embodiment, the ratio of the amount of emitted light to the amount of propagating light is changed according to the distance from the light source to cope with the above-described change in amount of light inside the light guide plate 12 by increasing the $\theta_2$-coefficient away from the light source (in other words, since the amount of light propagating inside the light guide plate 12 decreases away from the light source, the ratio of light directed toward the emergent surface 12b by the sharply inclined faces 14b is increased away from the light source). Consequently, the distribution of amount of emitted light can be made uniform in the plane of the light guide plate 12, and a uniform luminance distribution can be achieved.

Accordingly, the front light 10 of the first embodiment can uniformly and brightly illuminate a large area with low power consumption.

In the above description of the front light 10 of the embodiment, the $\theta_2$-coefficient is increased away from the light source by changing the inclination angle $\theta_1$ of the gently inclined faces 14a and the inclination angle $\theta_2$ of the sharply inclined faces 14b and decreasing the pitch P of the prism grooves 14 away from the light source while the sum of the inclination angles $\theta_1$ and $\theta_2$ is not fixed and the length L of the sharply inclined faces 14b is substantially fixed. Alternatively, the $\theta_2$-coefficient may be increased away from the light source by changing the inclination angle $\theta_1$ of the gently inclined faces 14a and the inclination angle $\theta_2$ of the sharply inclined faces 14b and changing both the pitch P of the prism grooves 14 and the length L of the sharply inclined faces 14b or changing the length L of the sharply inclined faces 14b (for example, increasing the length L of the sharply inclined faces 14b away from the light source) while the sum of $\theta_1$ and $\theta_2$ is not fixed.

The depth "d" of the prism grooves 14 does not always need to be fixed in the plane of the reflecting surface 12c. A case in which the depth "d" changes is also included in the technical scope of the present invention.

The $\theta_2$-coefficient does not always need to be equally changed from the light incident face to the terminal end face in the light guide plate, and may be arbitrarily set among the regions.

Figure 12A:
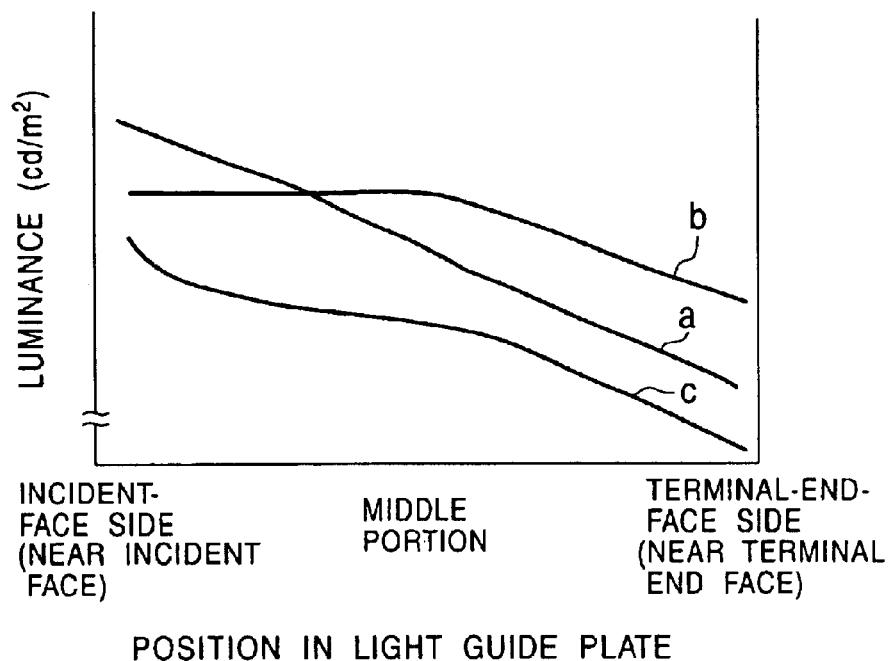
FIGS. 12A and 12B are graphs explaining an example in which a $\theta_2$-coefficient is changed depending on the luminance characteristics of regions in the light guide plate.
Figure 12B:
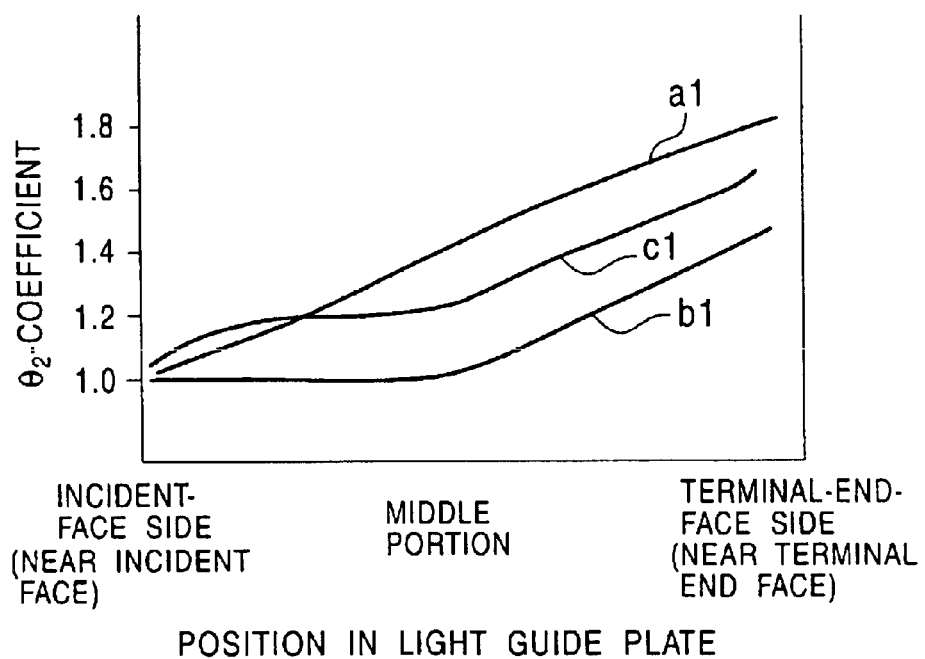

For example, in a case in which the light guide plate (before the $\theta_2$-coefficient is set) has regions A, B, and C having different luminance characteristics in the plane thereof, the $\theta_2$-coefficient may be set as follows:

In the region A having a luminance characteristic in which the luminance gradually decreases from the light incident face toward the terminal end face, as shown by a curve "a" in a graph of FIG. 12A, the $\theta_2$-coefficient is gradually increased from the light incident face toward the terminal end face, as shown by a curve "a1" in a graph of FIG. 12B. In the region B having a luminance characteristic in which the luminance is fixed between the light incident face and the middle portion and gradually decreases from the middle portion toward the terminal end face, as shown by a curve "b" in FIG. 12A, the $\theta_2$-coefficient is fixed between the light incident face and the middle portion and gradually increases from the middle portion toward the terminal end face, as shown by a curve "b1" in FIG. 12B. In the region C having a luminance characteristic shown by a curve "c" in FIG. 12A, the $\theta_2$-coefficient is changed, as shown by a curve "c1" in FIG. 12B. Consequently, variations in the luminance characteristics in the plane of the light guide plate are eliminated, and the amount of light emitted from the emergent surface of the light guide plate can be made uniform in the plane of the light guide plate.

[Liquid Crystal Display Unit]

The liquid crystal display unit 20 is a reflective passive-matrix liquid crystal display unit capable of color display. As shown in FIG. 3, a liquid crystal layer 23 is held between an upper substrate 21 and a lower substrate 22 opposing each other. A plurality of transparent electrodes 26a shaped like a strip in plan view and extending in the right-left direction in the figure, and an alignment film 26b are sequentially formed on the inner side of the upper substrate 21 (the side close to the liquid crystal layer 23). A reflective layer 25, a color filter layer 29, a plurality of transparent electrodes 28a shaped like a strip in plan view, and an alignment film 28b are sequentially formed on the inner side of the lower substrate 22 (the side close to the liquid crystal layer 23).

The transparent electrodes 26a of the upper substrate 21 and the transparent electrodes 28a of the lower substrate 22 are shaped like a flat strip, and are arranged in stripes in plan view. The extending direction of the transparent electrodes 26a is orthogonal to the extending direction of the transparent electrodes 28a in plan view. Therefore, one dot of the liquid crystal display unit 20 is formed at the intersection of one transparent electrode 26a and one transparent electrode 28a, and any one of color filters of three colors (red, green, and blue), which will be described, is disposed corresponding to each dot. Three dots of R (red), G (green), and B (blue) constitute one pixel 20c of the liquid crystal display unit 20, as shown in FIG. 3. Multiple pixels 20c are arranged in a matrix in plan view inside the display region 20D, as shown in FIG. 2.

In the color filter layer 29, color filters 29R, 29G, and 29B, respectively, of red, green, and blue are arranged periodically. Each color filter is formed under the corresponding transparent electrode 28a. A set of the color filters 29R, 29G, and 29B is placed at each pixel 20c. By controlling the driving of the electrodes corresponding to the color filters 29R, 29G, and 29B, a color displayed at the pixel 20c is controlled.

In the liquid crystal display device of the first embodiment, the extending direction of the prism grooves 14 formed on the light guide plate 12 of the front light 10 crosses the arranging direction of the pixels 20c in the liquid crystal display unit 20. That is, the direction of repetition of R, G, and B in the color filter layer 29 that provides a periodic pattern in the liquid crystal display unit 20 is not parallel to the extending direction of the prism grooves 14 in order to prevent moiré fringes due to optical interference therebetween.

Figure 6:
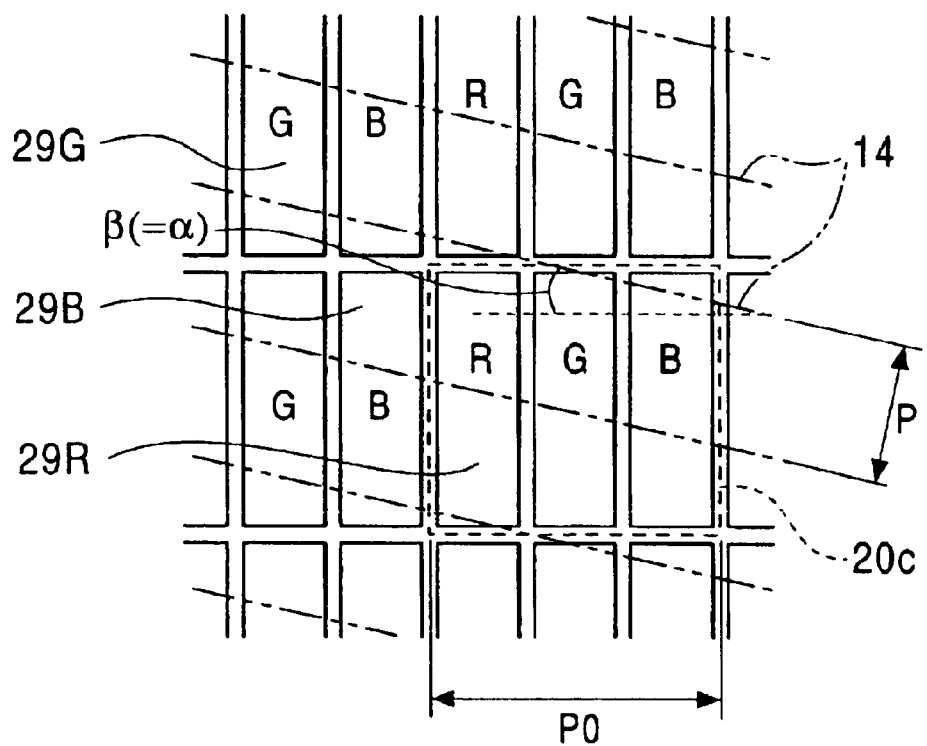
FIG. 6 is an enlarged structural plan view of pixels in a liquid crystal display unit shown in FIG. 2.

FIG. 6 is an enlarged structural plan view of a group of pixels adjoining in the liquid crystal display unit 20 shown in FIG. 2. In the liquid crystal display unit 20, a plurality of pixels 20c are formed in a matrix in plan view, as shown in the figure. Each of the pixels 20c includes a set of red, green, and blue color filters 29R, 29G, and 29B. The extending direction of the prism grooves 14 of the front light 10 shown by two-dot chain lines in FIG. 6 is inclined at an inclination angle β to the arranging direction (right-left direction in the figure) of the pixels 20c of the liquid crystal display unit 20, as shown in FIG. 6.

Preferably, the inclination angle β of the prism grooves 14 relative to the arranging direction of the pixels 20c (right-left direction in the figure) is within the range of 0° to 15°, and more preferably, within the range of 6.5° to 8.5°. By setting such a range, moiré fringes can be prevented from being produced by optical interference with the periodic structure of the pixels 20c in the liquid crystal display unit 20. The effect of lessening the moiré fringes tends to be small outside the above range. It is more preferable that the inclination angle β be within the range of 6.5° to 8.5°. By setting such a range, the effect of preventing the moiré fringes can be enhanced.

In the liquid crystal display device of the first embodiment, since the light-guide-plate end face 12a of the front light 10 and the pixel-arranging direction in the liquid crystal display unit 20 are parallel to each other, as shown in FIG. 2, the angle α formed between the extending direction of the prism grooves 14 and the light-guide-plate end face 12a coincides with the angle β formed between the extending direction of the prism grooves 14 and the arranging direction of the pixels 20c. In a case in which the light-guide-plate end face 12c is not parallel to the arranging direction of the pixels 20c, the inclination angles α and β are different. In this case, it is better, in order to reduce moiré fringes, to set the inclination angle β within the above range, in preference to the inclination angle α. Since the extending direction of the prism grooves 14 is determined by setting the inclination angle β, the angle of the light-guide-plate end face 12c relative to the prism grooves 14 is adjusted to be within the above range of the inclination angle α in order to achieve a uniform distribution of light emitted from the light guide plate 12.

The reflective layer 25 includes an organic film made of an acrylic resin material or the like, and a reflective metal film made of a high-reflectance metal, such as Al or Ag, on the organic film. A plurality of recesses having light reflectivity are provided on a surface of the reflective film 25. The organic film serves to give a predetermined surface shape to the metal reflective film.

Since the liquid crystal display device of the first embodiment has the front light 10 that can uniformly illuminate a large area with high intensity, the entire display region 20D is uniformly and brightly illuminated, and a superior display quality can be achieved. Even when a single light emitting element is used as the illumination device, the uniformity of brightness does not decrease, and display visibility is high. Therefore, a superior display quality and low power consumption are possible.

[Active-Matrix Liquid Crystal Display Unit]

While the liquid crystal display unit 20 in the above embodiment is of a passive-matrix type, the present invention is also applicable to an active-matrix liquid crystal display unit. Since the planar structure of the liquid crystal display unit in this case is similar to that of the liquid crystal display unit 20 of the above embodiment shown in FIG. 2, the following description will be given also with reference to FIG. 2. That is, the liquid crystal display unit of this type includes a plurality of pixels 20c arranged in a matrix in plan view.

Figure 7:
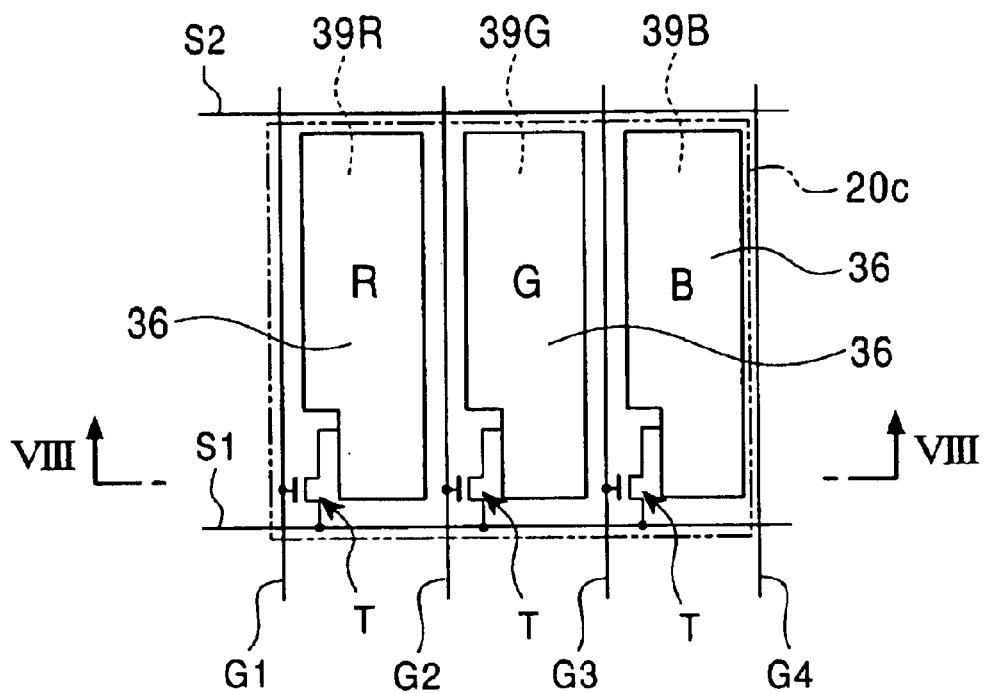
FIG. 7 is an enlarged structural plan view of pixels in an active-matrix liquid crystal display unit.
Figure 8:
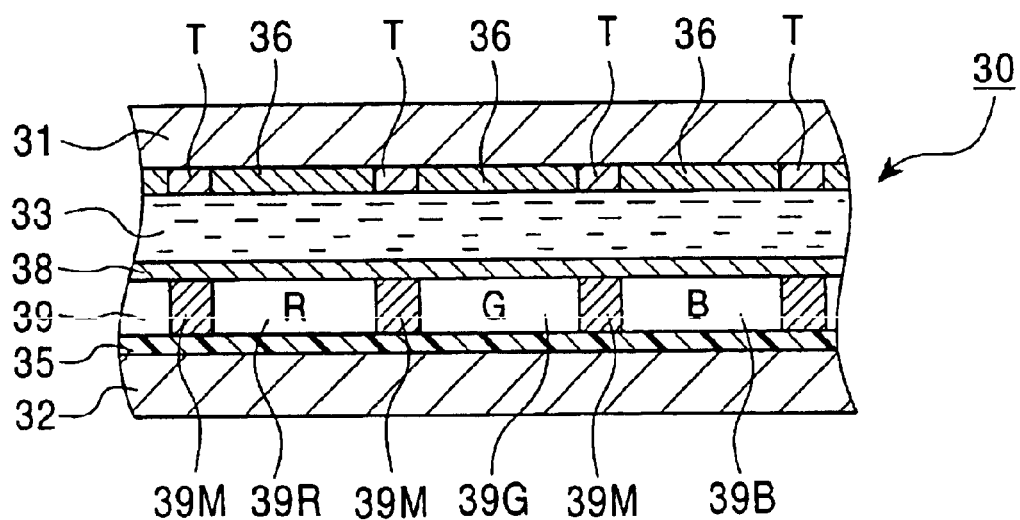
FIG. 8 is a cross-sectional view, taken along line VIII—VIII in FIG. 7.

FIG. 7 is a structural plan view of the pixels 20c formed in the liquid crystal display unit of this type, and FIG. 8 is a sectional structural view, taken along line VIII—VIII in FIG. 7. In a liquid crystal display unit shown in FIGS. 7 and 8, a liquid crystal layer 33 is held between an upper substrate 31 and a lower substrate 32 opposing each other. A plurality of substantially rectangular transparent electrodes 36 arranged in a matrix in plan view, and pixel-switching transistor elements T formed corresponding to the transparent electrodes 36 are provided on an inner side of the upper substrate 31 (side close to the liquid crystal layer 33). A reflective layer 35, a color filter layer 39 formed on the reflective layer 35, and a transparent electrode 38 formed over the entire surface of the color filter 39 are provided on an inner side of the lower substrate 32 (side close to the liquid crystal layer 33). A region in which three transparent electrodes 36 corresponding R, G, and B are formed corresponds to one pixel 20c. In FIG. 7, the transistor elements T are each shown by an equivalent circuit diagram for easy viewing.

The transistor elements T for switching the transparent electrodes 36 are connected at one end to the transparent electrodes 36, and are connected at the other two ends to scanning lines G1 to G3 extending in the up-down direction in the figure between the transparent electrodes 36, and to a signal line S1 extending in the right-left direction in the figure. The color filters 39R, 39G, and 39B are disposed in the color filter 39 of the lower substrate 32 at positions corresponding to the transparent electrodes 36, and a black matrix 39M shaped like a grid in plan view is disposed between the adjoining color filters 39R, 39G, and 39B. Although not shown, a black matrix shaped like a grid in plan view is also formed on the inner side of the upper substrate 31 to surround the transparent electrodes 36 so that light incident from the upper side does not enter the transistor elements T, and the scanning lines and the signal lines connected thereto.

The reflective layer 35 may be similar to the reflective layer 25 in the above embodiment.

The liquid crystal display unit of this type performs display by controlling the potential of each transparent electrode 36 by the transistor element T and controlling the state of light transmitted through the liquid crystal layer 33 between the transparent electrode 36 and the transparent electrode 38 in the lower substrate 32.

In the active-matrix liquid crystal display unit, a light-shielding black matrix is formed like a grid in plan view to surround the transparent electrodes 36, and the display contrast can be enhanced. Therefore, the periodic pattern of the pixels 20c tends to be clearer than in the passive-matrix liquid crystal display unit. That is, optical interference between the periodic arrangement of the pixels 20c and the prism grooves 14 of the front light 10 is prone to occur. In the liquid crystal display device of the embodiment, since the prism grooves 14 extend in a direction crossing the arranging direction of the pixels 20c, the above interference is inhibited, and visibility is effectively prevented from being reduced by moiré fringes. Even when the liquid crystal display device of the present invention adopts an active-matrix liquid crystal display unit in this way, moiré fringes are not caused in the display region, and a uniform and bright display of high quality is possible.

While the color filter layer 39 is formed on the reflective layer 35 in FIG. 8, pixel-switching electrodes may be formed in the lower substrate 32 to also function as a reflective layer, and a color filter layer may be formed in the upper substrate 31.

(Second Embodiment)

Figure 9:
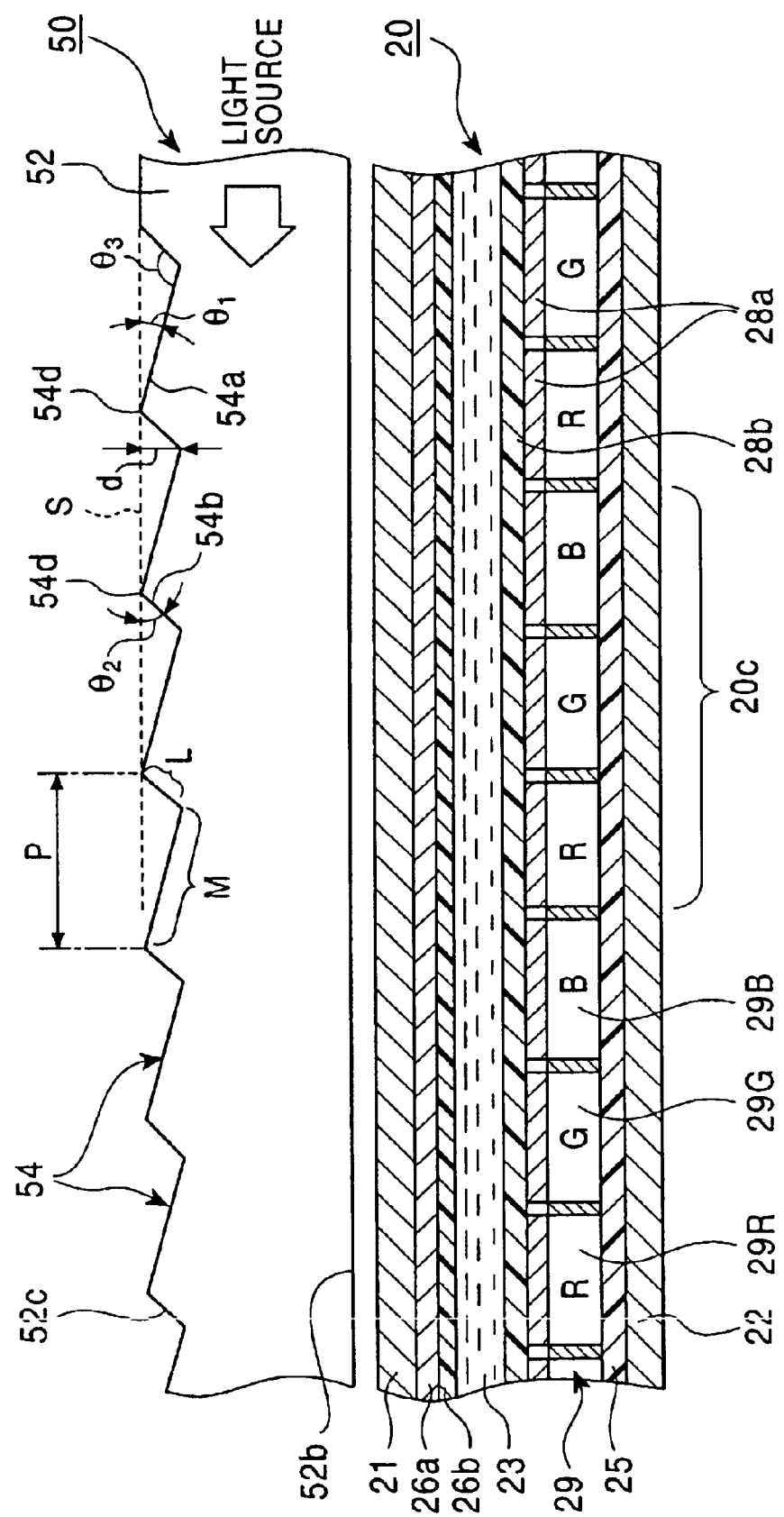
FIG. 9 is a cross-sectional view of a liquid crystal display device according to a second embodiment.

A liquid crystal display device according to a second embodiment of the present invention will now be described with reference to FIG. 9. FIG. 9 is a cross-sectional view of the liquid crystal display device of the second embodiment.

A front light 50 provided in the liquid crystal display device of the second embodiment is different from the front light 10 used in the first embodiment in a means for increasing the $\theta_2$-coefficient away from the light source in a light guide plate, that is, in a condition on which prism grooves 54 are formed on an upper surface of a light guide plate 52. Since other structures are similar to those in the front light 10 shown in FIGS. 1 to 3, detailed descriptions thereof are omitted below. Since a liquid crystal display unit 20 is equivalent to the liquid crystal display unit shown in FIGS. 1 to 3, a detailed description thereof is also omitted.

In the light guide plate 52 provided in the front light 50 of the first embodiment, the inclination angle $\theta_1$ of gently inclined faces 54a increases away from a light source, and the inclination angle $\theta_2$ of sharply inclined faces 54b decreases away from the light source, as shown in FIG. 9. The sum of the inclination angles $\theta_1$ and $\theta_2$ is substantially fixed. Furthermore, while the length L of the sharply inclined faces 54b is substantially fixed, the pitch P of the prism grooves 54 (width of the prism grooves) varies. More specifically, the pitch P decreases away from the light source.

The length M of the gently inclined faces 54a decreases away from the light source. The depth "d" of the prism grooves 54 (distance between a reference plane S and the bottoms of the prism grooves 54) is fixed in the plane of a reflecting surface 52c.

Since the sum of the inclination angles $\theta_1$ and $\theta_2$ is substantially fixed in the light guide plate 52 provided in the front light 50, as described above, the angle $\theta_3$ of the bottoms of the prism grooves 54 is substantially fixed.

Figure 11A:
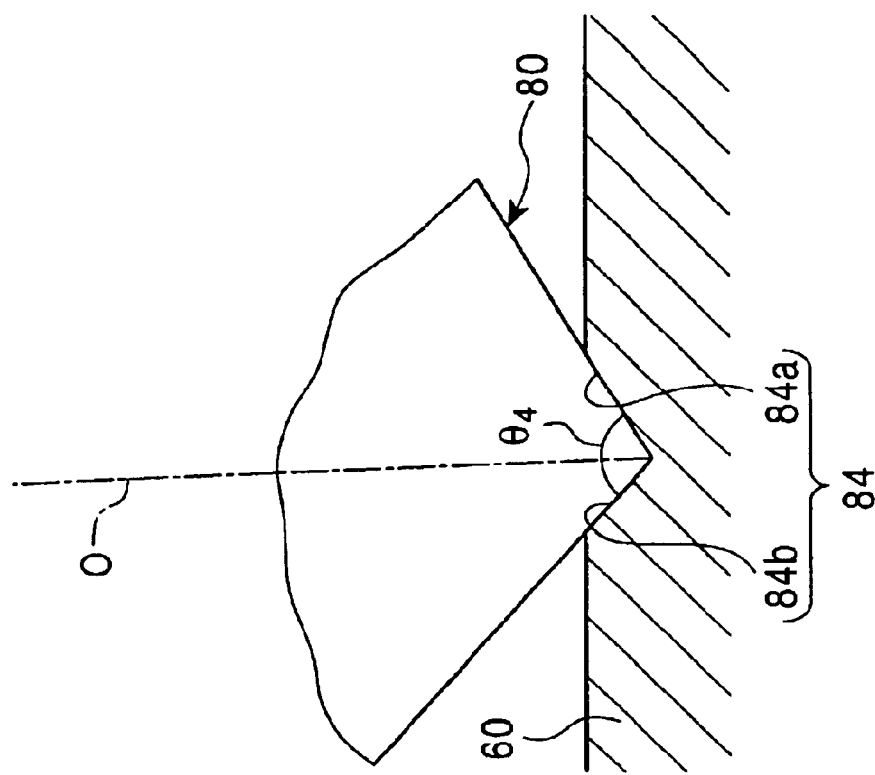
FIGS. 11A and 11B are explanatory views showing a production method for a mold base material for forming a mold used to produce a light guide plate provided in a front light shown in FIG. 9.
Figure 11B:
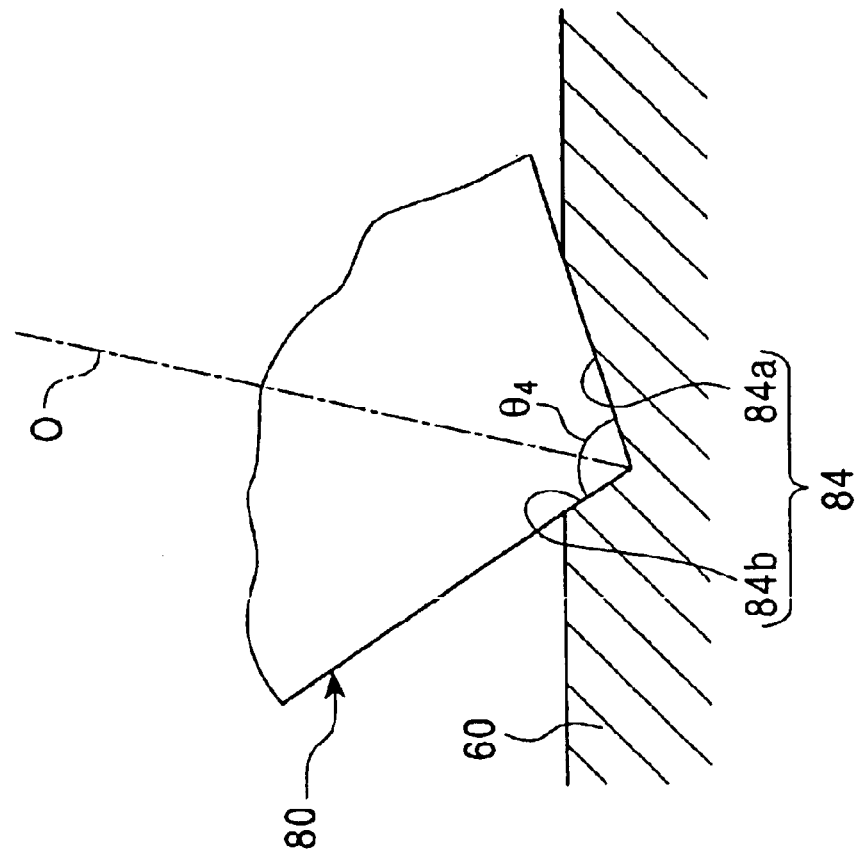

The above-described light guide plate 52 can be produced, for example, by producing, on one surface of a mold base material, a mold having grooves of a shape similar to that of the prism grooves 54 by cutting with a cutting tool, producing, by the mold, an injection mold having irregularities reverse to those on the surface of the produced mold with the grooves, and performing injection molding with the injection mold. Regarding the production method for the mold, a first inclined face 84a having an inclination angle similar to that of a gently inclined face 54a and a second inclined face 84b having an inclination angle similar to that of a sharply inclined face 14b of the prism groove 14 are simultaneously formed by cutting a surface of a mold base material 60 made of a Ni-plated stainless steel flat plate with a cutting tool 80 in which the angle $\theta_4$ of a cutting edge is equal to $180° - (\theta_1 + \theta_2)$, as shown in FIG. 11A, thereby forming one groove 84. By sequentially forming grooves 84 in a manner similar to the above while changing the angle of the center axis O of the cutting tool 80, as shown in FIG. 11B, a mold having a plurality of grooves 84 arranged in stripes can be obtained.

Since the front light 50 of the second embodiment is provided with the light guide plate 52 in which the $\theta_2$-coefficient increases away from the light source, a large area can be uniformly and brightly illuminated with low power consumption.

Since the sum of $\theta_1$ and $\theta_2$ of the prism grooves 54 is fixed in the light guide plate 52, as described above, when the grooves 84 having a shape similar to that of the prism grooves 54 are formed on one surface of the mold base material 60 by cutting with the cutting tool, the first inclined face 84a having an inclination angle similar to that of the gently inclined face 54a and the second inclined face 84b having an inclination angle similar to that of the sharply inclined face 54b can be simultaneously obtained by forming one groove with the cutting tool 80 in which the angle of the cutting edge is equal to $180°-(\theta_1+\theta_2)$. This is advantageous because the number of operation processes for forming one groove is reduced, and the production procedure for the light guide plate can be simplified.

EXAMPLES

The present invention will be described below in more detail in conjunction with examples. It should be noted that the following examples do not limit the scope of the present invention.

First Example

As a first example, a liquid crystal display device was produced which was similar to the liquid crystal display device of the first embodiment shown in FIGS. 1 to 3 except that the $\theta_2$-coefficient was increased away from a light source by changing the pitch P of prism grooves 14 formed on a reflecting surface 12c in a light guide plate 12 of a front light 10, the inclination angle $\theta_1$ and length M of gently inclined faces 14a, and the inclination angle $\theta_2$ and length L of sharply inclined faces 14b, as shown in the following Table 1 and that a white LED (NSCW215T from Nichia Corporation) was used as a light emitting element 15. The luminance distribution in the display surface was measured when the front light 10 of the first example was lighted. Moreover, the display contrast (CR) during white display/black display in the liquid crystal display device was measured. The external appearance of the liquid crystal display device was also evaluated visually. The results are shown in Table 4.

The depth "d" of the prism grooves 14 was fixed at 6.0 μm, and the length L of the sharply inclined faces 14b was substantially fixed. Herein, the $\theta_2$-coefficient refers to the product of the number of the sharply inclined faces 14b per unit length of the light guide plate 12 (1 mm in the light guide plate in the up-down direction in FIG. 2 or in the right-left direction in FIG. 3), and the length L of the sharply inclined faces 14b. ARTON (name of a product from JSR Corporation) was used as the material of the light guide plate 12. Acrylic resin was used as the material of an intermediate light guide 13. A liquid crystal display unit 20 had a planar size of approximately 70 mm×50 mm.

Figure 13:
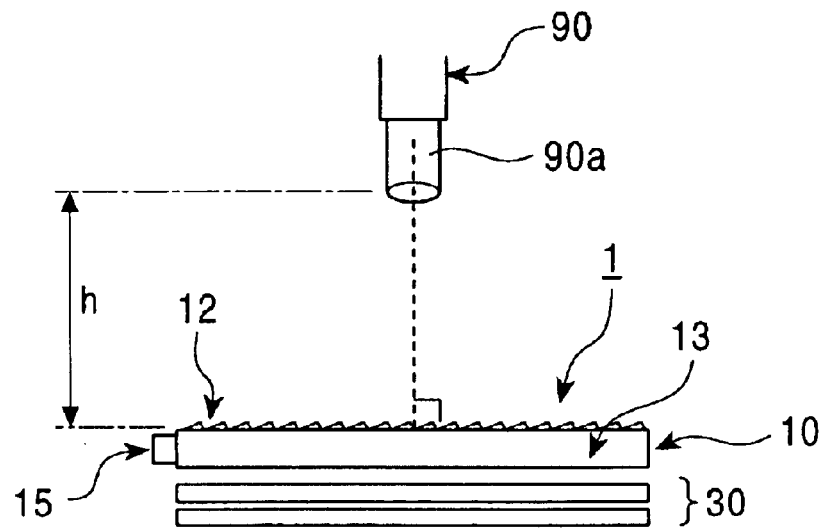
FIG. 13 is an explanatory view showing a method for measuring the luminance distribution of the liquid crystal display device.
Figure 14:
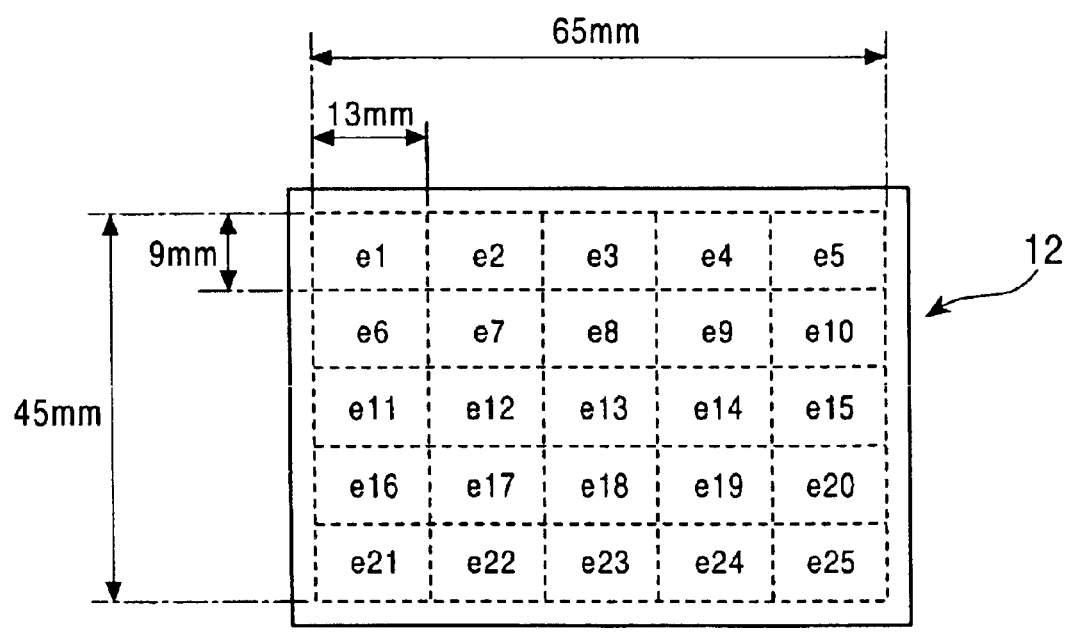
FIG. 14 is an explanatory view showing areas on a display surface when the luminance distribution of the liquid crystal display device is measured.

Regarding the measurement of the luminance distribution, as shown in FIG. 13, a liquid crystal display device 1 was obtained by placing the front light 10 of the first example on the display region of the active-matrix (TFT) reflective liquid crystal display unit 30 shown in FIG. 8, and was placed in a dark room. A luminance colorimeter (BM5A from Topcon Corporation) 90 was placed so that a light receiving portion 90a is disposed at a height "h" of approximately 200 mm from the liquid crystal display device 1 in the direction of the normal to the device, and the front light 10 was lighted by energizing the light emitting element 15 with 15 mA and 3.2 V to perform display on the liquid crystal display device 1. The luminance of the display surface was measured in a visual field of 1°. The display surface was viewed from the normal direction. As shown in FIG. 14, the display surface of the liquid crystal display device 1 (that is, the surface of the light guide plate) was divided into 25 areas "e1" to "e25", and almost the center of each area (one area has a size of 13 mm×9 mm) was measured. The maximum, minimum (min), and average luminances were obtained from the luminances of the areas "e1" to "e25" and the luminance uniformity (A) that was defined as being equal to {maximum luminance (max)/minimum luminance (min)}×100(%), was calculated. The calculation result is shown in Table 4. In FIG. 14, the areas "e1" to "e5" are disposed close to the terminal end face 12d, the areas "e21" to "e25" are disposed close to the light incident face 12a, and the light emitting element 15 is disposed close to the area "e21".

TABLE 1

| Prism Groove Forming Conditions | Unit | Near Light Incident Face | Between Light Incident Face and Center | Center | Between Center and Terminal End Face | Near Terminal End Face |
|---|---|---|---|---|---|---|
| Pitch P | (mm) | 0.20 | 0.18 | 0.16 | 0.14 | 0.12 |
| Depth D | (μm) | 6.0 | 6.0 | 6.0 | 6.0 | 6.0 |
| Inclination Angle $\theta_1$ (Gently Inclined Face) | (°) | 1.78 | 1.98 | 2.24 | 2.57 | 3.01 |
| Inclination Angle $\theta_2$ (Sharply Inclined Face) | (°) | 41.0 | 42.0 | 43.0 | 44.0 | 45.0 |
| Length M of Gently Inclined Face | (μm) | 193.2 | 173.4 | 153.7 | 133.9 | 114.2 |
| Length L of Sharply Inclined Face | (μm) | 9.1 | 9.0 | 8.8 | 8.6 | 8.5 |
| Number of Sharply Inclined Faces/mm | 1/mm | 5.00 | 5.56 | 6.25 | 7.14 | 8.33 |
| $\theta_2$-coefficient | | $45.7 \times 10^{-3}$ | $49.8 \times 10^{-3}$ | $55.0 \times 10^{-3}$ | $61.7 \times 10^{-3}$ | $70.7 \times 10^{-3}$ |
| $\theta_1 + \theta_2$ | (°) | 42.8 | 44.0 | 45.2 | 46.6 | 48.0 |
| $\theta_3 = 180 - (\theta_1 + \theta_2)$ | (°) | 137.2 | 136.0 | 134.8 | 133.4 | 132.0 |

Second Example

As a second example a liquid crystal display device was produced which was similar to the liquid crystal display device of the second embodiment shown in FIG. 9 except that the $\theta_2$-coefficient was increased away from a light source by changing the pitch P of prism grooves 54 formed on a reflecting surface 52c of a light guide plate 52 in a front light 10, the inclination angle $\theta_1$ and length M of gently inclined faces 54a, and the inclination angle $\theta_2$ and length L of sharply inclined faces 54b, as shown in the following Table 2, while the sum of the inclination angle $\theta_1$ of the gently inclined faces 54a and the inclination angle $\theta_2$ of the sharply inclined faces 54b was substantially fixed, and that a white LED (NSCW215T from Nichia Corporation) was used as a light emitting element 15. The liquid crystal display device was obtained by placing the front light 50 of the second example on the display region of the active-matrix (TFT) reflective liquid crystal display unit 30 shown in FIG. 8, and the luminance distribution in the display surface when the front light 50 of the liquid crystal display device was lighted was measured in a manner similar to the above-described manner. Moreover, the display contrast during white display/black display in the liquid crystal display device was measured. The external appearance of the liquid crystal display device was also evaluated visually. The results are shown in Table 4.

The depth "d" of the prism grooves 54 was fixed at 6.0 μm, and the length L of the sharply inclined faces 54b was substantially fixed. Herein, the $\theta_2$-coefficient refers to the product of the number of the sharply inclined faces 54b per unit length of the light guide plate 52 (1 mm in the light guide plate in the right-left direction in FIG. 9), and the length L of the sharply inclined faces 54b. ARTON (name of a product from JSR Corporation) was used as the material of the light guide plate 52. Acrylic resin was used as the material of an intermediate light guide 13. The liquid crystal display unit 20 had a planar size of approximately 70 mm×50 mm.

TABLE 2

| Prism Groove Forming Conditions | Unit | Near Light Incident Face | Between Light Incident Face and Center | Center | Between Center and Terminal End Face | Near Terminal End Face |
| --- | --- | --- | --- | --- | --- | --- |
| Pitch P | (mm) | 0.20 | 0.18 | 0.16 | 0.14 | 0.12 |
| Depth D | (μm) | 6.0 | 6.0 | 6.0 | 6.0 | 6.0 |
| Inclination Angle $\theta_1$ (Gently Inclined Face) | (°) | 1.77 | 1.98 | 2.24 | 2.57 | 3.03 |
| Inclination Angle $\theta_2$ (Sharply Inclined Face) | (°) | 43.5 | 43.3 | 43.0 | 42.7 | 42.2 |
| Length M of Gently Inclined Face | (μm) | 194.25 | 173.7 | 153.7 | 133.8 | 113.6 |
| Length L of Sharply Inclined Face | (μm) | 8.72 | 8.8 | 8.8 | 8.9 | 8.9 |
| Number of Sharply Inclined Faces/mm | 1/mm | 5.00 | 5.56 | 6.25 | 7.14 | 8.33 |
| $\theta_2$-coefficient | | $43.6 \times 10^{-3}$ | $48.6 \times 10^{-3}$ | $55.0 \times 10^{-3}$ | $63.2 \times 10^{-3}$ | $74.4 \times 10^{-3}$ |
| $\theta_1 + \theta_2$ | (°) | 45.2 | 45.3 | 45.2 | 45.2 | 45.3 |
| $\theta_3 = 180 - (\theta_1 + \theta_2)$ | (°) | 134.8 | 134.7 | 134.8 | 134.8 | 134.7 |

First Comparative Example

Figure 15A:
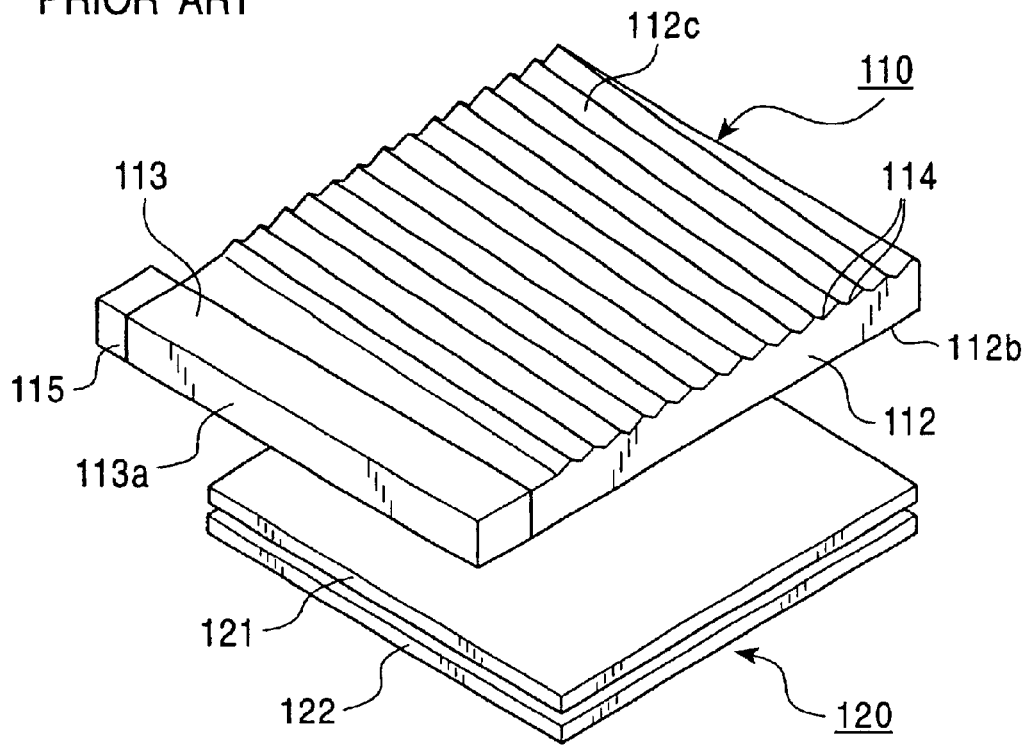
FIG. 15A is a perspective view of a conventional liquid crystal display device.
Figure 15B:
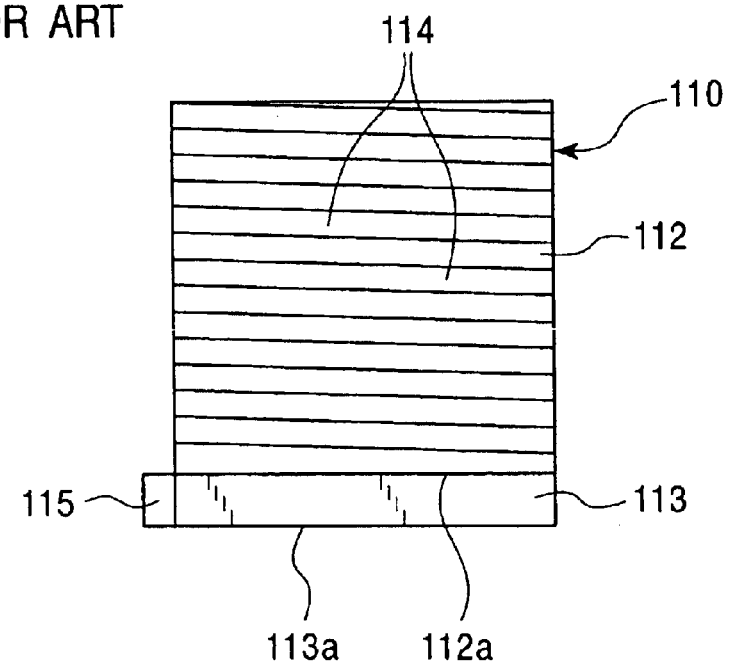
FIG. 15B is a plan view of a front light provided in the liquid crystal display device shown in FIG. 15A.
Figure 16:
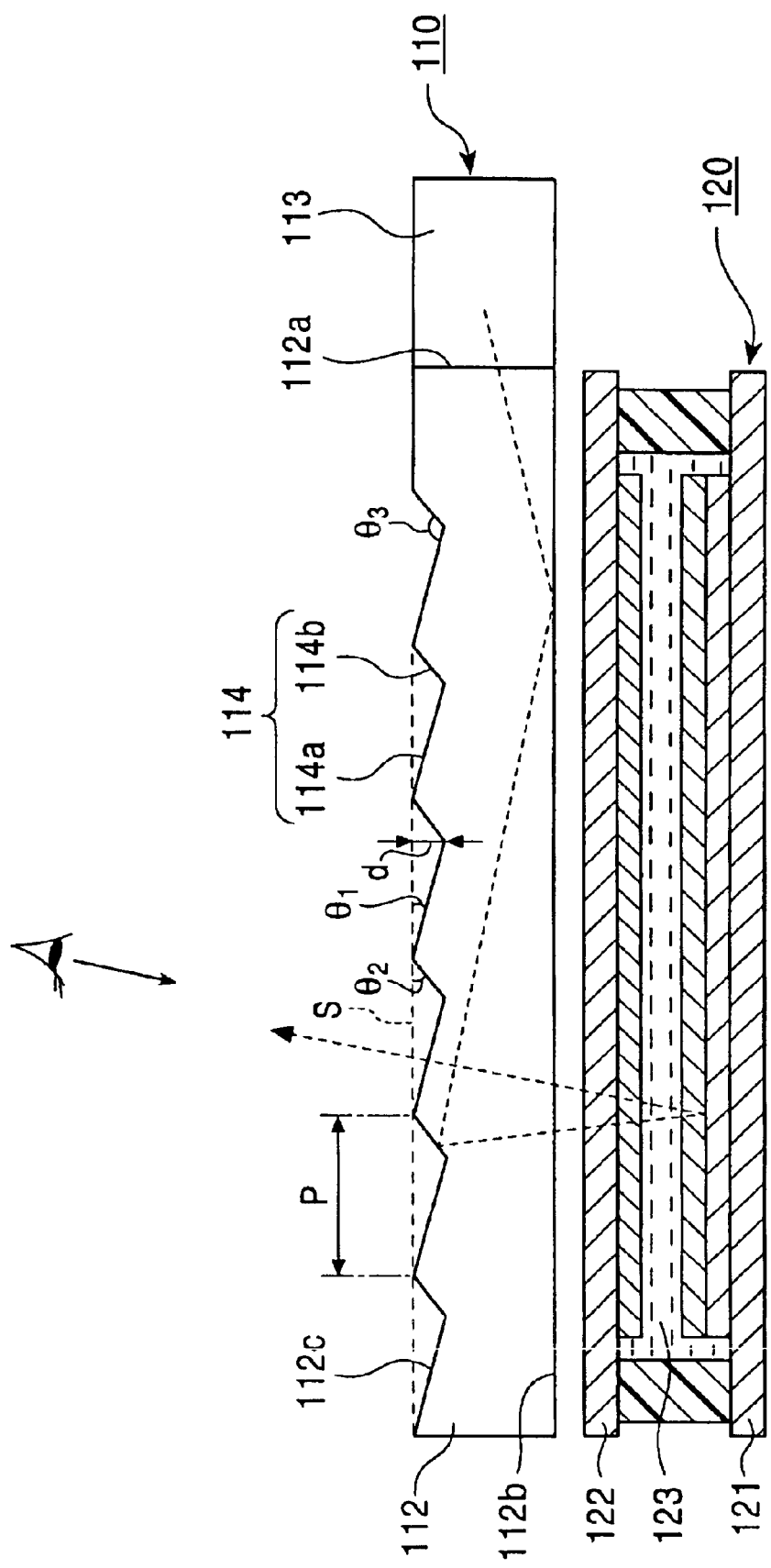
FIG. 16 is a cross-sectional view of the liquid crystal display device shown in FIG. 15.

As a first comparative example, a liquid crystal display device was produced which was similar to the conventional liquid crystal display device shown in FIGS. 15 and 16 except that the $\theta_2$-coefficient was fixed, regardless of the distance from a light source, without changing the pitch P and depth "d" of prism grooves 114 formed on a reflecting surface 112c, the inclination angle $\theta_1$ and length M of gently inclined faces 114a, and the inclination angle $\theta_2$ and length L of sharply inclined faces 114b, as shown in the following Table 3, in a light guide plate 112 of a front light 110, and that a white LED (NSCW215T from Nichia Corporation) was used as a light emitting element 15. The liquid crystal display device was obtained by placing the front light 110 of the first comparative example on the display region of the active-matrix (TFT) reflective liquid crystal display unit 30 shown in FIG. 8, and the luminance distribution in the display surface when the front light 110 of the liquid crystal display device was lighted was measured in a manner similar to the above-described manner. Moreover, the display contrast during white display/black display in the liquid crystal display device. The external appearance of the liquid crystal display device was also evaluated visually. The results are shown in Table 4.

Herein, the $\theta_2$-coefficient refers to the product of the number of the sharply inclined faces 114b per unit length of the light guide plate 112 (1 mm in the light guide plate in the right-left direction in FIG. 16), and the length L of the sharply inclined faces 114b. ARTON (name of a product from JSR Corporation) was used as the material of the light guide plate 112. Acrylic resin was used as the material of an intermediate light guide 113. The liquid crystal display unit 120 had a planar size of approximately 70 mm×50 mm.

e2, and e6) close to the terminal end face of the light guide plate, and the external appearance is on a level such that variations in luminance are easily visible.

TABLE 3

| Prism Groove Forming Conditions | Unit | Near Light Incident Face | Between Light Incident Face and Center | Center | Between Center and Terminal End Face | Near Terminal End Face |
|---|---|---|---|---|---|---|
| Pitch P | (mm) | 0.16 | 0.16 | 0.16 | 0.16 | 0.16 |
| Depth D | ($\mu$m) | 6.0 | 6.0 | 6.0 | 6.0 | 6.0 |
| Inclination Angle $\theta_1$ (Gently Inclined Face) | (°) | 2.25 | 2.25 | 2.25 | 2.25 | 2.25 |
| Inclination Angle $\theta_2$ (Sharply Inclined Face) | (°) | 43.0 | 43.0 | 43.0 | 43.0 | 43.0 |
| Length M of Gently Inclined Face | ($\mu$m) | 152.8 | 152.8 | 152.8 | 152.8 | 152.8 |
| Length L of Sharply Inclined Face | ($\mu$m) | 8.8 | 8.8 | 8.8 | 8.8 | 8.8 |
| Number of Sharply Inclined Faces/mm | 1/mm | 6.25 | 6.25 | 6.25 | 6.25 | 6.25 |
| $\theta_2$-coefficient | | $55.0 \times 10^{-3}$ | $55.0 \times 10^{-3}$ | $55.0 \times 10^{-3}$ | $55.0 \times 10^{-3}$ | $55.0 \times 10^{-3}$ |
| $\theta_1 + \theta_2$ | (°) | 45.3 | 45.3 | 45.3 | 45.3 | 45.3 |
| $\theta_3 = 180 - (\theta_1 + \theta_2)$ | (°) | 134.8 | 134.8 | 134.8 | 134.8 | 134.8 |

TABLE 4

| Item Unit | Luminance max cd/m² | Luminance min cd/m² | Average Luminance cd/m² | Luminance Uniformity % | CR | External Appearance |
|---|---|---|---|---|---|---|
| First Example | 8.9 | 6.8 | 8.3 | 77 | 11 | B |
| Second Example | 9.7 | 6.9 | 8.6 | 71 | 9 | C |
| Third Example | 9.7 | 6.7 | 8.2 | 70 | 10 | B |
| Fourth Example | 10.4 | 6.4 | 7.0 | 60 | 13 | A |
| Fifth Example | 10.1 | 6.7 | 7.7 | 66 | 10 | A |
| First Comparative Example | 11.0 | 4.8 | 8.1 | 44 | 10 | D |

In the column "External Appearance" in Table 4, A shows a state in which the appearance is very good, B shows a state in which there is no problem in actual use, C shows a state in which one of nonuniform luminance and moiré fringes are caused, and D shows a state in which the appearance is very bad because of nonuniform luminance, moiré fringes, and so on.

The results shown in Table 4 reveal that there is a great difference between the maximum luminance and the minimum luminance and the luminance uniformity is low in the liquid crystal display device having the front light of the first comparative example because the front light has the light guide plate in which the pitch P and depth d of the prism grooves 114, the inclination angle $\theta_1$ and length M of the gently inclined faces 114a, and the inclination angle $\theta_2$ and length L of the sharply inclined faces 114b are fixed. Moreover, the luminance is low particularly in the areas (e1, The front light of the first example is provided with the light guide plate in which the depth "d" of the prism grooves is fixed, the length L of the sharply inclined faces 14b is substantially fixed, the inclination angle $\theta_1$ of the gently inclined faces 14a of the prism grooves 14 and the inclination angle $\theta_2$ of the sharply inclined faces 14b are appropriately changed, and the prism-groove pitch P is appropriately decreased toward the terminal end face (the prism-groove pitch P is decreased away from the light source). As shown in Table 4, the difference between the maximum luminance and the minimum luminance can be reduced, and the luminance uniformity is high in the liquid crystal display device having this front light.

Furthermore, the amount of light emitted from the light guide plate can be made uniform by increasing the illuminating function per unit length of the light guide plate, contrary to the reduction of the amount of light propagating inside the light guide plate from the light incident face toward the terminal end face. More specifically, by setting the $\theta_2$-coefficient contrary to the reduction of the amount of light propagating inside the light guide plate, that is, by increasing the $\theta_2$-coefficient away from the light source, the amount of light emitted from the emergent surface of the light guide plate can be made uniform in the plane of the light guide plate, and variations in luminance on the display surface can be prevented.

The front light of the second example is provided with the light guide plate in which the sum of the inclination angle $\theta_1$ of the gently inclined faces 14a of the prism grooves 14 and the inclination angle $\theta_2$ of the sharply inclined faces 14b, and the length L of the sharply inclined faces 14b are substantially fixed, the prism-groove depth "d" is fixed, the inclination angles $\theta_1$ and $\theta_2$ are appropriately changed, and the prism-groove pitch P is appropriately decreased toward the terminal end face (the prism-groove pitch P is decreased away from the light source). In the liquid crystal display device having this front light, the difference between the maximum luminance and the minimum luminance can be reduced and the luminance uniformity can be enhanced. Therefore, in the liquid crystal display device having the front light of the second example, the amount of light emitted from the emergent surface of the light guide plate can be made uniform in the plane of the light guide plate, and variations in luminance on the display surface can be prevented.

Third Example

Figure 17:
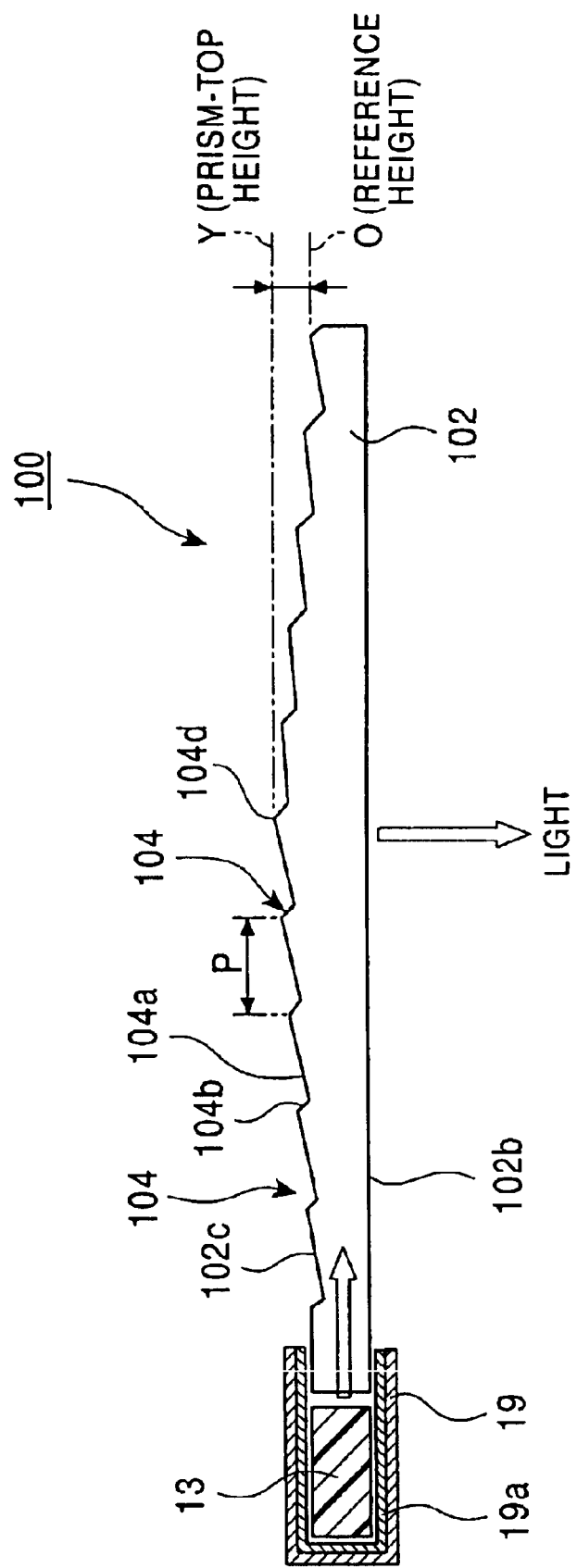
FIG. 17 is a cross-sectional view of a front light according to a third embodiment.

As a third example, a front light 100 shown in FIG. 17 was produced. The front light 100 used a light guide plate 102 in which the $\theta_2$-coefficient was increased away from a light source by changing the length L of sharply inclined faces 104b and the prism-top height Y (height of the tops 104d between the adjoining prism grooves 104) while the pitch P of prism grooves 104 formed on a reflecting surface 102c, the inclination angle $\theta_1$ and length M of gently inclined faces 104a, and the inclination angle $\theta_2$ of the sharply inclined faces 104b are fixed, as shown in the following Table 5. A white LED (NSCW215T from Nichia Corporation) was used as a light emitting element, ARTON (name of a product from JSR Corporation) was used as the material of the light guide plate 102, and acrylic resin was used as the material of an intermediate light guide 13. The inclination angle α of the prism grooves 104 was set at 0°.

Herein, the $\theta_2$-coefficient refers to the ratio of the length L of the sharply inclined face 104b to the pitch P of the prism grooves 104, that is, L (μm)/P (μm).

Figure 18:
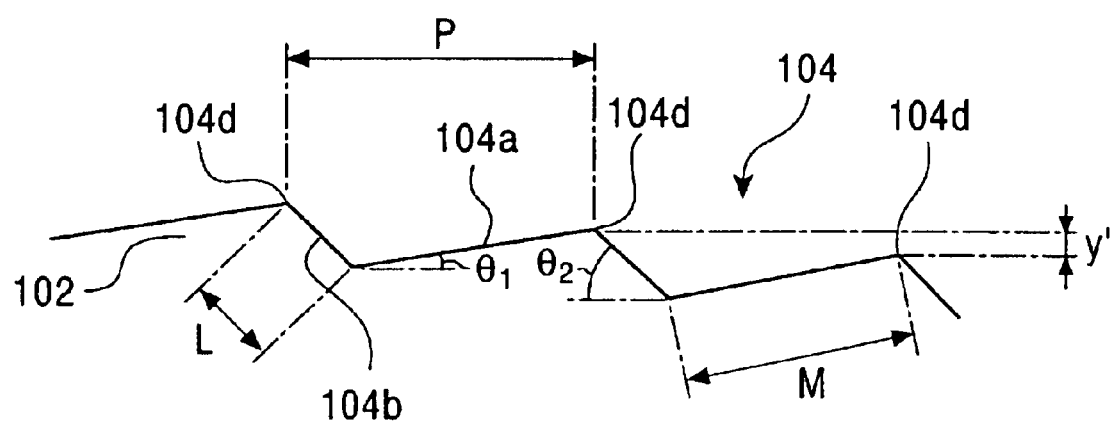
FIG. 18 is a partial sectional view of a light guide plate of the front light shown in FIG. 17.

In this example, a difference y' in height between the adjoining tops 104d shown in FIG. 18 was given by the following Equation 1 in order to change the length L of the sharply inclined faces 104b:

$$y' = -L \cos\theta_2 \cdot \tan\theta_2 + (P - L\cos\theta_1)\tan\theta_2 \qquad \text{(Equation 1)}$$

wherein L represents the length of the sharply inclined faces, P represents the pitch of the prism grooves 104, $\theta_1$ represents the inclination angle of the gently inclined faces 104a, and $\theta_2$ represents the inclination angle of the sharply inclined faces 104b.

The prism-top height Y is obtained by sequentially accumulating the differences y' from the light incident face of the light guide plate 102. When the length L of the sharply inclined faces 104b is linearly changed, Y can be approximated by a quadratic equation of the distance X of the light guide plate 102 from a prism-working start position. The maximum prism-top height Y is approximately 260 μm because of working limitations. In order to reduce the maximum prism-top height Y, it is preferable that a position where y'=0 be set at the center of a prism-working region of the light guide plate.

A liquid crystal display device was obtained by placing the front light 100 of the third example on the display region of the active-matrix (TFT) reflective liquid crystal display unit 30 shown in FIG. 8, and the luminance distribution in the display surface when the front light 100 was lighted was measured in a manner similar to the above-described manner. The display contrast during white display/black display of the liquid crystal display device having the front light 100 of the third example was measured. Moreover, the external appearance of the liquid crystal display device was evaluated visually. The results are also shown in Table 4.

TABLE 5

| | | Inclination Angle of Prism Grooves: 0° | | | | |
|---|---|---|---|---|---|---|
| Prism Groove Forming Conditions | Unit | Near Light Incident Face | Between Light Incident Face and Center | Center | Between Center and Terminal End Face | Near Terminal End Face |
| Pitch P | (mm) | 0.255 | 0.255 | 0.255 | 0.255 | 0.255 |
| Top Height Y | (μm) | 0.0 | 55.5 | 71.8 | 49.3 | 0.0 |
| Inclination Angle $\theta_1$ (Gently Inclined Face) | (°) | 2.30 | 2.30 | 2.30 | 2.30 | 2.30 |
| Inclination Angle $\theta_2$ (Sharply Inclined Face) | (°) | 43.0 | 43.0 | 43.0 | 43.0 | 43.0 |
| Length L of Sharply Inclined Face | (μm) | 12.1 | 13.3 | 14.6 | 15.8 | 17.0 |
| $\theta_2$-coefficient | | 0.047 | 0.052 | 0.057 | 0.062 | 0.067 |

Fourth Example

As a fourth example, a front light was produced that was similar to that in the third example except for a light guide plate 102 in which the $\theta_2$-coefficient was increased away from a light source by changing the length L of sharply inclined faces 104b and the prism-top height Y (height of tops 104d between the adjoining prism grooves 104) while the pitch P of prism grooves 104 formed on a reflecting surface 102c, the inclination angle $\theta_1$ and length M of gently inclined faces 104a, and the inclination angle $\theta_2$ of the sharply inclined faces 104b are fixed, as shown in the following Table 6.

A liquid crystal display device was obtained by placing the front light of the fourth example on the display region of the active-matrix (TFT) reflective liquid crystal display unit 30 shown in FIG. 8, and the luminance distribution in the display surface when the front light was lighted was measured in a manner similar to the above-described manner. The display contrast during white display/black display of the liquid crystal display device having the front light of the fourth example was measured. Moreover, the external appearance of the liquid crystal display device was evaluated visually. The results are also shown in Table 4.

plate 102 in which the $\theta_2$-coefficient was increased away from a light source by changing the length L of sharply inclined faces 104b and the prism top height Y (height of tops 104d between the adjoining prism grooves 104) while the pitch P of prism grooves 104 formed on a reflecting surface 102c, the inclination angle $\theta_1$ and length M of gently inclined faces 104a, and the inclination angle $\theta_2$ of the sharply inclined faces 104b were fixed, as shown in the following Table 7, and except that the inclination angle $\alpha$ of the prism grooves 104 was set at 7.5°.

A liquid crystal display device was obtained by placing the front light of the fifth example on the display region of the active-matrix (TFT) reflective liquid crystal display unit 30 shown in FIG. 8, and the luminance distribution in the display surface when the front light was lighted was measured in a manner similar to the above-described manner. The display contrast during white display/black display of

TABLE 6

Inclination Angle of Prism Grooves: 0°.

| Prism Groove Forming Conditions | Unit | Near Light Incident Face | Between Light Incident Face and Center | Center | Between Center and Terminal End Face | Near Terminal End Face |
|---|---|---|---|---|---|---|
| Pitch P | (mm) | 0.19 | 0.19 | 0.19 | 0.19 | 0.19 |
| Top Height Y | (μm) | −16.2 | 0.0 | −19.1 | −73.6 | −163.4 |
| Inclination Angle $\theta_1$ (Gently Inclined Face) | (°) | 2.60 | 2.60 | 2.60 | 2.60 | 2.60 |
| Inclination Angle $\theta_2$ (Sharply Inclined Face) | (°) | 41.0 | 41.0 | 41.0 | 41.0 | 41.0 |
| Length L of Sharply Inclined Face | (μm) | 11.8 | 12.7 | 13.6 | 14.5 | 15.4 |
| $\theta_2$-coefficient | | 0.062 | 0.066 | 0.071 | 0.076 | 0.080 |

Fifth Example

As a fifth example, a front light was produced which was similar to that in the third example except for a light guide the liquid crystal display device having the front light of the fifth example was measured. Moreover, the external appearance of the liquid crystal display device was evaluated visually. The results are also shown in Table 4.

TABLE 7

Inclination Angle of Prism Grooves: 7.5°

| Prism Groove Forming Conditions | Unit | Near Light Incident Face | Between Light Incident Face and Center | Center | Between Center and Terminal End Face | Near Terminal End Face |
|---|---|---|---|---|---|---|
| Pitch P | (mm) | 0.18 | 0.18 | 0.18 | 0.18 | 0.18 |
| Top Height Y | (μm) | 0.0 | 40.9 | 54.7 | 41.0 | 0.0 |
| Inclination Angle $\theta_1$ (Gently Inclined Face) | (°) | 2.30 | 2.30 | 2.30 | 2.30 | 2.30 |
| Inclination Angle $\theta_2$ (Sharply Inclined Face) | (°) | 43.0 | 43.0 | 43.0 | 43.0 | 43.0 |
| Length L of Sharply | (μm) | 11.8 | 12.7 | 13.6 | 14.5 | 15.4 |

TABLE 7-continued

| Prism Groove Forming Conditions | Unit | Near Light Incident Face | Between Light Incident Face and Center | Center | Between Center and Terminal End Face | Near Terminal End Face |
|---|---|---|---|---|---|---|
| Inclination Angle of Prism Grooves: 7.5° | | | | | | |
| Inclined Face $\theta_2$-coefficient | | 0.066 | 0.071 | 0.075 | 0.081 | 0.085 |

The front lights of the third to fifth examples were more easily worked than in the first and second examples because the inclination angle $\theta_1$ of the gently inclined faces formed on the light guide plate and the inclination angle $\theta_2$ of the sharply inclined faces were fixed. The fourth and fifth examples look quite good and are superior in appearance.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An illumination device comprising:
a light source; and
a light guide plate that receives light from the light source through an end face and that emits the light propagating therein from one surface,
wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle larger than an inclination angle of the gently inclined faces, and
wherein the inclination angle of the sharply inclined faces increases away from the light source.

2. An illumination device comprising:
a light source; and
a light guide plate that receives light from the light source through an end face and that emits the light propagating therein from one surface,
wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle larger than an inclination angle of the gently inclined faces, and
wherein a length of the sharply inclined faces increases away from the light source.

3. An illumination device comprising:
a light source; and
a light guide plate that receives light from the light source through an end face and that emits the light propagating therein from one surface,
wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle $\theta_2$ larger than an inclination angle $\theta_1$ of the gently inclined faces,
wherein, a $\theta_2$-coefficient of the light guide plate increases away from the light source, and the $\theta_2$-coefficient is one of a ratio of a length of the sharply inclined faces to a pitch of the prism grooves, and the product of the number of the sharply inclined faces per unit length of the light guide plate, and the length of the sharply inclined faces, the pitch being constant.

4. An illumination device according to claim 3, wherein the $\theta_2$-coefficient of the light guide plate is increased away from the light source by changing the inclination angle $\theta_1$ of the gently inclined faces and the inclination angle $\theta_2$ of the sharply inclined faces.

5. An illumination device according to claim 3, wherein the $\theta_2$-coefficient of the light guide plate is increased away from the light source by changing at least one of the pitch of the prism grooves and the length of the sharply inclined faces while the sum of the inclination angle $\theta_1$ of the gently inclined faces and the inclination angle $\theta_2$ of the sharply inclined faces is not fixed.

6. An illumination device according to claim 3, wherein the $\theta_2$-coefficient is increased away from the light source by changing the length of the sharply inclined faces while the sum of the inclination angle $\theta_1$ of the gently inclined faces and the inclination angle $\theta_2$ of the sharply inclined faces is substantially fixed.

7. An illumination device according to claim 3, wherein the $\theta_2$-coefficient is increased away from the light source by changing the length of the sharply inclined faces and a height of prism tops between the prism grooves while the inclination angle $\theta_1$ of the gently inclined faces, and the inclination angle $\theta_2$ of the sharply inclined faces, are fixed.

8. An illumination device according to claim 3, wherein the $\theta_2$-coefficient is set to be within the range of 0.045 to 0.085 when being the product of the number of the sharply inclined faces per unit length of the light guide plate, and the length of the sharply inclined faces.

9. An illumination device according to claim 3, wherein the inclination angle $\theta_1$ of the gently inclined faces of the prism grooves in the light guide plate is set to be within the range of 1° to 5°, and the inclination angle $\theta_2$ of the sharply inclined faces is set to be within the range of 40° to 45°.

10. An illumination device according to claim 3, wherein an angle formed between the prism grooves and the light incident face of the light guide is within the range of 6.5° to 8.5°.

27

11. A liquid crystal display device comprising: an illumination device; and
    a liquid crystal display unit to be illuminated by the illumination device,
    wherein the illumination device comprises:
    a light source; and
    a light guide plate that receives light from the light source through an end face and that emits the light propagating therein from one surface,
    wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle larger than an inclination angle of the gently inclined faces, and
    wherein the inclination angle of the sharply inclined faces increases away from the light source.

12. A liquid crystal display device comprising:
    an illumination device; and
    a liquid crystal display unit to be illuminated by the illumination device,
    wherein the illumination device comprises:
    a light source; and
    a light guide plate that receives light from the light source through an end face and that emits the light propagating therein from one surface,
    wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle larger than an inclination angle of the gently inclined faces, and
    wherein a length of the sharply inclined faces increases away from the light source.

13. A liquid crystal display device comprising:
    an illumination device; and
    a liquid crystal display unit to be illuminated by the illumination device,
    wherein the illumination device comprises:
    a light source; and
    a light guide plate that receives light from the light source through an end face and that emits the light propagating therein from one surface,
    wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle $\theta_2$ larger than an inclination angle $\theta_1$ of the gently inclined faces,
    wherein a $\theta_2$-coefficient of the light guide plate increases away from the light source, and the $v_2$-coefficient is one of a ratio of a length of the sharply inclined faces to the pitch of the prism grooves, and a product of the number of the sharply inclined faces per unit length of the light guide plate, and the length of the sharply inclined faces, the pitch being constant.

14. An illumination device according to claim 3, wherein the $\theta_2$-coefficient of the light guide plate is increased away from the light source by changing the length of the sharply inclined faces, and a prism-top height.

15. A liquid crystal display device according to claim 13, wherein the $\theta_2$-coefficient of the light guide plate is increased away from the light source by changing the inclination angle $\theta_1$ of the gently inclined faces and the inclination angle $\theta_1$ of the sharply inclined feces.

16. An liquid crystal display device according to claim 13, wherein the $\theta_2$-coefficient of the light guide plate is increased away from the light source by changing the length of the sharply inclined faces while the sum of the inclination angle $\theta_1$ of the gently inclined faces and the inclination angle $\theta_2$ of the sharply inclined faces is varied.

17. A liquid crystal display device according to claim 13, wherein the $\theta_2$-coefficient is increased away from the light source by changing the length of the sharply inclined faces while the sum of the inclination angle $\theta_1$ of the gently inclined faces and the inclination angle $\theta_2$ of the sharply inclined faces is fixed.

18. A liquid crystal display device according to claim 13, wherein the $\theta_2$-coefficient is increased away from the light source by changing the length of the sharply inclined faces and a height of prism tops between the prism grooves while the inclination angle $\theta_1$ of the gently inclined faces, the inclination angle $\theta_2$ of the sharply inclined faces are fixed.

19. A liquid crystal display device according to claim 13, wherein the $\theta_2$-coefficient is set to be within the range of 0.045 to 0.085 when being the product of the number of the sharply inclined faces per unit length of the light guide plate, and the length of the sharply inclined faces.

20. A liquid crystal display device according to claim 13, wherein the inclination angle $\theta_1$ of the gently inclined faces of the prism grooves in the light guide plate is set to be within the range of 1° to 5°, and the inclination angle $\theta_2$ of the sharply inclined faces is set to be within the range of 40° to 45°.

21. A liquid crystal display device according to claim 13, wherein an angle formed between the prism grooves and the light incident face of the light guide is within the range of 6.5° to 8.5°.

22. An illumination device comprising:
    a light source; and
    a light guide plate that receives light from the light source through an end face and that emits the light propagating therein from one surface,
    wherein the end face of the light guide plate through which the light is received serves as a light incident face, and another surface of the light guide plate is provided with a plurality of prism grooves arranged in stripes in plan view and having gently inclined faces and sharply inclined faces inclined at an inclination angle $\theta_2$ larger than an inclination angle $\theta_1$ of the gently inclined faces,
    wherein the pitch and at least one of the inclination angle of the sharply inclined faces, the length of the sharply inclined faces, and a height of prism tops, varies such that a $\theta_2$-coefficient of the light guide plate increases away from the light source, and the $\theta_2$-coefficient is one of a ratio of a length of the sharply inclined faces to a pitch of the prism grooves, and the product of the number of the sharply inclined faces per unit length of the light guide plate, and the length of the sharply inclined faces.

* * * * *

UNITED STATES PATENT AND TRADEMARK OFFICE
CERTIFICATE OF CORRECTION

PATENT NO. : 6,906,348 B2
DATED : June 14, 2005
INVENTOR(S) : Takuro Sugiura

It is certified that error appears in the above-identified patent and that said Letters Patent is hereby corrected as shown below:

Column 27,
Line 60, delete "$V_2$-coefficient" and substitute -- $\theta_2$-coefficient --.

Column 28,
Line 7, delete "$\theta_1$ of the sharply" and substitute -- $\theta_2$ of the sharply --.
Line 8, before "liquid crystal" delete "An" and substitute -- A --.

Signed and Sealed this

Eighteenth Day of April, 2006

JON W. DUDAS
*Director of the United States Patent and Trademark Office*